United States Patent
Heishi et al.

(10) Patent No.: US 7,761,692 B2
(45) Date of Patent: Jul. 20, 2010

(54) PROCESSOR, COMPILER AND COMPILATION METHOD

(75) Inventors: Taketo Heishi, Osaka (JP); Shuichi Takayama, Hyogo (JP); Tetsuya Tanaka, Osaka (JP); Hajime Ogawa, Kyoto (JP); Nobuo Higaki, Hyogo (JP)

(73) Assignee: Panasonic Corporation, Osaka (JP)

( * ) Notice: Subject to any disclaimer, the term of this patent is extended or adjusted under 35 U.S.C. 154(b) by 436 days.

(21) Appl. No.: 11/452,282

(22) Filed: Jun. 14, 2006

(65) Prior Publication Data

US 2006/0242387 A1    Oct. 26, 2006

Related U.S. Application Data

(62) Division of application No. 10/246,482, filed on Sep. 19, 2002, now Pat. No. 7,076,638.

(30) Foreign Application Priority Data

Sep. 20, 2001 (JP) .............................. 2001-286393

(51) Int. Cl.
*G06F 9/38* (2006.01)
*G06F 9/45* (2006.01)

(52) U.S. Cl. ..................................................... 712/220
(58) Field of Classification Search ................. 712/214, 712/220
See application file for complete search history.

(56) References Cited

U.S. PATENT DOCUMENTS

| | | | |
|---|---|---|---|
| 5,295,249 A | 3/1994 | Blaner et al. | |
| 5,355,460 A | 10/1994 | Eickemeyer et al. | |
| 5,440,703 A | 8/1995 | Ray et al. | |
| 5,440,750 A * | 8/1995 | Kitai et al. | 712/203 |

(Continued)

FOREIGN PATENT DOCUMENTS

CN    1117166    2/1996

(Continued)

OTHER PUBLICATIONS

Suresh, P., et al, "PERL A Registerless Architecture", High Performance Computing, 1998, 5th International Conference on Madras, India Dec. 17-20, 1998, Los Angeles, CA, USA, pp. 33-40, XP 010317631.

(Continued)

*Primary Examiner*—Eric Coleman
(74) *Attorney, Agent, or Firm*—McDermott Will & Emery LLP

(57) ABSTRACT

In order to overcome the problem that conditionally executed instructions are executed as no-operation instructions if their condition is not fulfilled, leading to poor utilization efficiency of the hardware and lowering the effective performance, the processor decodes a number of instructions that is greater than the number of provided computing units and judges their execution conditions with an instruction issue control portion before the execution stage, Instructions for which the condition is false are invalidated, and subsequent valid instructions are assigned so that the computing units (hardware) is used efficiently. A compiler performs scheduling such that the number of instructions whose execution condition is true does not exceed the upper limit of the degree of parallelism of the hardware. The number of instructions arranged in parallel at each cycle may exceed the degree of parallelism of the hardware.

11 Claims, 19 Drawing Sheets

U.S. PATENT DOCUMENTS

| | | | |
|---|---|---|---|
| 5,459,844 A | 10/1995 | Eickemeyer et al. | |
| 5,598,546 A | 1/1997 | Blomgren | |
| 5,600,806 A | 2/1997 | Brown et al. | |
| 5,870,582 A | 2/1999 | Cheong et al. | |
| 5,872,990 A | 2/1999 | Luick et al. | |
| 5,961,629 A | 10/1999 | Nguyen et al. | |
| 6,041,399 A * | 3/2000 | Terada et al. | 712/24 |
| 6,112,299 A * | 8/2000 | Ebcioglu et al. | 712/236 |
| 6,115,806 A | 9/2000 | Yoshida | |
| 6,216,220 B1 | 4/2001 | Hwang | |
| 6,237,086 B1 | 5/2001 | Koppala et al. | |
| 6,253,371 B1 | 6/2001 | Iwasawa et al. | |
| 6,269,439 B1 | 7/2001 | Hanaki | |
| 6,301,651 B1 | 10/2001 | Chang et al. | |
| 6,356,994 B1 * | 3/2002 | Barry et al. | 712/24 |
| 6,367,070 B1 | 4/2002 | Haghighat et al. | |
| 6,490,673 B1 * | 12/2002 | Heishi et al. | 712/213 |
| 6,499,096 B1 * | 12/2002 | Suzuki | 712/24 |
| 6,609,193 B1 * | 8/2003 | Douglas et al. | 712/219 |
| 6,681,319 B1 * | 1/2004 | Djafarian et al. | 712/208 |
| 6,775,766 B2 * | 8/2004 | Revilla et al. | 712/245 |
| 7,296,141 B2 * | 11/2007 | Kruckemyer | 712/233 |

FOREIGN PATENT DOCUMENTS

| | | |
|---|---|---|
| CN | 1206145 | 1/1999 |
| EP | 1 011 052 A2 | 6/2000 |
| JP | 62-65133 A | 3/1987 |
| JP | 64-082131 | 3/1989 |
| JP | 09-265400 | 10/1997 |
| JP | 09-311786 | 12/1997 |
| JP | 10-27102 A | 1/1998 |
| JP | 11-296377 A | 10/1999 |
| JP | 2000-3279 A | 1/2000 |
| JP | 2000-284970 A | 10/2000 |
| JP | 2001-236227 A | 8/2001 |

OTHER PUBLICATIONS

Sato, T., et al., "In Search of Efficient Reliable Processor Design", Parallel Processing, International Confernece, Sep. 3-7, 2001, Piscataway, NJ, pp. 525-532, XP010558340.

European Search Report issued in European Patent Application EP 02 02 1046, mailed May 29, 2007.

* cited by examiner

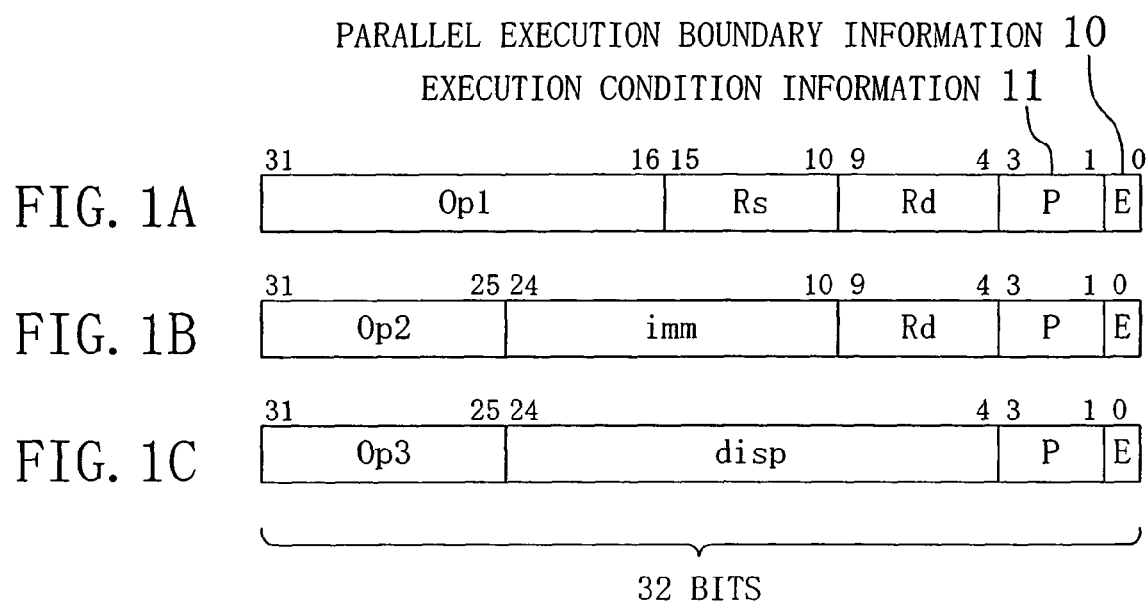

|  |  |  |  | PARALLEL EXECUTION BOUNDARY INFORMATION (E) |
|---|---|---|---|---|
| INSTRUCTION 1 | [C0] | add | 1, R0 | 0 |
| INSTRUCTION 2 | [C1] | sub | 1, R0 | 0 |
| INSTRUCTION 3 |  | add | R1, R2 | 1 |
| INSTRUCTION 4 |  | st | R0, (R3) | 0 |
| INSTRUCTION 5 |  | mov | R2, R4 | 1 |

|  |  |  | PARALLEL EXECUTION BOUNDARY INFORMATION (E) |
|---|---|---|---|
| INSTRUCTION 1 | [C0] | add 1, R0 | 0 |
| INSTRUCTION 2 | [C1] | sub 1, R0 | 1 |
| INSTRUCTION 3 |  | add R1, R2 | 0 |
| INSTRUCTION 4 |  | st R0, (R3) | 1 |
| INSTRUCTION 5 |  | mov R2, R4 | 1 |

| INSTRUCTION 1 |  | cmpeq | 0, R0, C0:C1 |
| INSTRUCTION 2 | [C0] | mov | R2, R1 |
| INSTRUCTION 3 | [C1] | mov | R3, R1 |
| INSTRUCTION 4 |  | add | R1, R4 |

FIG. 15

| INSTRUCTION 1 | | ld | (mem1), R0 |
| --- | --- | --- | --- |
| INSTRUCTION 2 | | cmpeq | 0, R0, C0:C1 |
| INSTRUCTION 3 | [C0] | add | R1, R2 |
| INSTRUCTION 4 | [C1] | add | R2, R3 |
| INSTRUCTION 5 | | add | R2, R3 |
| INSTRUCTION 6 | | ld | (mem2), R2 |

FIG. 16

|    | C0 | C1 | C2 | C3 | C4 | C5 | C6 | C7 |
| --- | --- | --- | --- | --- | --- | --- | --- | --- |
| C0 | 0 | 1 | 0 | 0 | 0 | 0 | 0 | 0 |
| C1 | 1 | 0 | 0 | 0 | 0 | 0 | 0 | 0 |
| C2 | 0 | 0 | 0 | 0 | 0 | 0 | 0 | 0 |
| C3 | 0 | 0 | 0 | 0 | 0 | 0 | 0 | 0 |
| C4 | 0 | 0 | 0 | 0 | 0 | 0 | 0 | 0 |
| C5 | 0 | 0 | 0 | 0 | 0 | 0 | 0 | 0 |
| C6 | 0 | 0 | 0 | 0 | 0 | 0 | 0 | 0 |
| C7 | 0 | 0 | 0 | 0 | 0 | 0 | 0 | 0 |

| INSTRUCTION 1 | | cmpeq | 0, R0, C0:C1 |
|---|---|---|---|
| INSTRUCTION 2 | [C0] | add | R1, R2 |
| INSTRUCTION 3 | [C1] | add | R2, R3 |
| INSTRUCTION 4 | [C0] | add | R1, R3 |
| INSTRUCTION 5 | [C1] | add | R3, R4 |
| INSTRUCTION 6 | [C0] | add | R2, R4 |
| INSTRUCTION 7 | [C1] | add | R3, R5 |

FIG. 24

|  |  |  | PARALLEL EXECUTION BOUNDARY INFORMATION (E) |
|---|---|---|---|
| INSTRUCTION 1 |  | lsr R3, R1 | 0 |
| INSTRUCTION 2 | [C0] | sub 1, R0 | 0 |
| INSTRUCTION 3 | [C1] | add 1, R0 | 0 |
| INSTRUCTION 4 | [C1] | add R1, R2 | 1 |

FIG. 26

| INSTRUCTION 1 |  | lsr R3, R1 |
|---|---|---|
| INSTRUCTION 2 | [C1] | add 1, R0 |
| INSTRUCTION 3 | [C0] | sub 1, R0 |
| INSTRUCTION 4 | [C1] | add R1, R2 |

PROCESSOR, COMPILER AND COMPILATION METHOD

RELATED APPLICATION

This application is a divisional application of Ser. No. 10/246,482, filed Sep. 19, 2002, now U.S. Pat. No. 7,076,638 which claims priority of Japanese Patent application No. 2001-286393, filed Sep. 20, 2001, and the contents of which are herewith incorporated by reference.

BACKGROUND OF THE INVENTION

The present invention relates to processors, compilers and compilation methods, and in particular to technology for improving performance by using computing units efficiently in parallel processing.

In recent years, higher functionality and higher speeds of products with microprocessors have brought about a need for microprocessors (referred to simply as "processors" in the following) having a high processing performance. In general, in order to increase the throughput of instructions, the pipeline approach is adopted, in which one instruction is broken down into several processing units (here referred to as "stages"), and a plurality of instructions are processed in parallel by executing each stage with separate pieces of hardware. In addition to spatially parallel processing as with the pipeline approach, higher performance is achieved by the VLIW (very long instruction word) approach or the superscalar approach in which temporal parallel processing is performed at the instruction level.

One major factor obstructing performance increases in processors is the overhead for branching processes. With this overhead, the penalty for instruction supply is larger, the more stages there are in the pipeline process. Furthermore, in parallel processing of instructions, the higher the degree of parallelism becomes, the higher is the frequency of branching instructions and the more manifest becomes the overhead.

As a conventional technology for countering this overhead, there is a conditional execution approach, according to which information indicating execution conditions is added to the instructions, and the operations indicated by the instructions are executed only when those conditions are satisfied. With this approach, condition flags corresponding to the execution conditions added to the instructions are referenced at execution time, and if the conditions are not fulfilled, then the execution result of the instruction is invalidated, that is, it is executed as a no-operation instruction.

For example, when the process flow including the conditional branch shown in FIG. 10 is notated in a format adding to the instructions information indicating an execution condition, then a program as shown in FIG. 11 results. In FIG. 11, C0 and C1 represent the conditions that are added to the instructions, and if the value of the condition flags corresponding thereto is true, then the instructions are executed, whereas if it is false, then the instructions are executed as no-operation instructions. In this example, first the comparison result of instruction 1 (comparison instruction) is stored in C0. At the same time, C1 is set to a condition that is opposite that of C0. Consequently, the operation of either instruction 2 or instruction 3 is actually executed, whereas the other one is executed as a no-operation instruction. As a result, a branching process is unnecessary, and the overhead of the branching process is countered.

In the above-described conventional conditional execution approach, if the condition is not satisfied, the corresponding instruction is performed as a no-operation instruction, and the operation is effectively not executed. Consequently, even though the two instructions are notated in parallel and use two computing units, actually only one computing unit can be effectively utilized in practice. As a result, there is the problem that the effective performance is lower than one would expect for the degree of parallelism with which the program is notated.

SUMMARY OF THE INVENTION

It is an object of the present invention to provide a processor in which an effective utilization of hardware is achieved and performance is improved.

To attain these objects, in one aspect of the present invention, a processor includes an instruction supply means for supplying a plurality of instructions, each instruction including information specifying the instruction's operation and execution condition information specifying a condition indicating whether the instruction is executed, a decoding means for decoding the plurality of instructions, an instruction issue control means which references the condition specified by the execution condition information to determine an instruction or a set of instructions whose valid operation is executed, and an execution means for executing one or a plurality of operations based on the information specifying the operation of the instructions, wherein the instruction issue control means has the function to decide, by referencing the condition specified by the execution condition information, whether an instruction is a valid instruction that needs to be executed or an invalid instruction that does not need to be executed, to cause the deletion of an instruction that has been decided to be an invalid instruction before it is issued to the execution means, and to issue a valid instruction following that invalid instruction to the execution means instead of the invalid instruction. With this configuration, non-operation instructions are not executed when the condition of conditional instructions are not fulfilled, and the computing units in the execution means are effectively utilized by the subsequent instructions, so that the utilization efficiency of the computing units can be increased and the effective performance can be improved.

In another aspect of the present invention, a processor includes an instruction supply means for supplying a plurality of instructions, each instruction including information specifying an operation of the instruction, a decoding means for decoding the plurality of instructions, an instruction issue control means which determines an instruction or a set of instructions whose valid operation is executed, and an execution means for executing one or a plurality of operations based on the information specifying the operation of the instructions, wherein the instruction issue control means has the function to detect, from an instruction group decoded by the decoding means, a combination of a plurality of instructions whose function may be executable as a single instruction, and to link this plurality of instructions so that they are treated as a single instruction. Thus, instructions that were originally supposed to use a plurality of computing units in the execution means can be executed by a single computing unit, so that the utilization efficiency of the computing units can be increased and the effective performance can be improved.

In another aspect of the present invention, a compiler for converting source code of a program notated in a high-level language into executable code includes an instruction scheduling means for rearranging instructions in the source code such that a plurality of instructions to be executed in parallel are adjacent to one another, the instruction scheduling means including a condition exclusivity analysis means for analyzing whether it is possible that conditions for the execution of valid operations specified in each instruction are simultaneously satisfied, and an instruction rearrangement means for rearranging instructions such that a set of parallel executable instructions can be delimited for each cycle, wherein the instruction rearrangement means judges whether computation resources used by those of the instructions placed in one cycle whose valid operation is executed do not exceed a restriction of computing units with which a target machine is provided, and if the condition exclusivity analysis means has judged that the execution conditions of two instructions placed in that cycle cannot be satisfied simultaneously, then the instruction rearrangement means treats the two instructions as if only one of the two instructions uses the computation resources under a given condition. Thus, by considering the deletion of instructions, it becomes possible to arrange a number of instructions per cycle that is greater than the number of provided computing units, so that the effective performance can be improved.

In yet another aspect of the present invention, a compiler for converting source code of a program notated in a high-level language into executable code includes an instruction scheduling means for rearranging instructions in the source code such that a plurality of instructions to be executed in parallel are adjacent to one another, the instruction scheduling means including an instruction rearrangement means for rearranging instructions such that a set of parallel executable instructions can be delimited for each cycle, wherein the instruction rearrangement means detects a combination of instructions by which the function of a plurality of instructions can be executed in a single instruction, and treats this plurality of instructions as a single instruction that has bee linked together, to judge whether placement is possible in that cycle. Thus, by considering the deletion of instructions, it becomes possible to arrange a number of instructions per cycle that is greater than the number of provided computing units, so that the effective performance can be improved.

In yet another aspect of the present invention, a compiler for converting source code of a program notated in a high-level language into executable code includes an instruction scheduling means for rearranging instructions in the source code such that a plurality of instructions to be executed in parallel are adjacent to one another, the instruction scheduling means including a condition exclusivity analysis means for analyzing whether it is possible that conditions for the execution of valid operations specified in each instruction are simultaneously satisfied, and an instruction rearrangement means for rearranging instructions such that a set of parallel executable instructions can be delimited for each cycle, wherein the condition exclusivity analysis means generates, for instructions at the beginning each basic block and instructions that update any condition affecting validity of operation execution, tables that indicate the possibilities that condition flags are satisfied simultaneously at the respective times. Thus, the exclusivity of execution conditions among instructions can be analyzed by generating the necessary minimum information, and a reduction of the memory used by the compiler as well as the effect of a higher compilation speed can be achieved.

In yet another aspect of the present invention, a compilation method for converting source code of a program notated in a high-level language into executable code includes an instruction scheduling step for rearranging instructions in the source code such that a plurality of instructions to be executed in parallel are adjacent to one another, the instruction scheduling step including a condition exclusivity analysis step for analyzing whether it is possible that conditions for the execution of valid operations specified in each instruction are simultaneously satisfied, and an instruction rearrangement step for rearranging instructions such that a set of parallel executable instructions can be delimited for each cycle, wherein the instruction rearrangement step comprises an arrangement possibility judgment step that judges whether computation resources used by those of the instructions placed in one cycle whose valid operation is executed do not exceed a restriction of computing units with which a target machine is provided, and if the condition exclusivity analysis step has judged that the execution conditions of two instructions placed in that cycle cannot be satisfied simultaneously, then the arrangement possibility judgment step treats the two instructions as if only one of the two instructions uses the computation resources.

In yet another aspect of the present invention, a recording medium storing a program for converting source code of a program notated in a high-level language into executable code including an instruction scheduling step for rearranging instructions in the source code such that a plurality of instructions to be executed in parallel are adjacent to one another, the instruction scheduling step including a condition exclusivity analysis step for analyzing whether it is possible that conditions for the execution of valid operations added to each instruction are simultaneously satisfied, and an instruction rearrangement step for rearranging instructions such that a set of parallel executable instructions can be delimited for each cycle, wherein the instruction rearrangement step comprises an arrangement possibility judgment step that judges whether computation resources used by those of the instructions placed in one cycle whose valid operation is executed do not exceed a restriction of computing units with which a target machine is provided, and if the condition exclusivity analysis step has judged that the execution conditions of two instructions placed in that cycle cannot be satisfied simultaneously, then the arrangement possibility judgment step treats the two instructions as if only one of the two instructions uses the computation resources.

BRIEF DESCRIPTION OF THE DRAWINGS

FIGS. 1A, 1B and 1C illustrate the structure of instructions executed by a processor in accordance with Embodiment 1 of the present invention.

FIG. 15 shows an example of assembler code.

FIG. 16 shows a condition exclusivity information table corresponding to instruction 2 in the assembler code of FIG. 15.

FIG. 24 shows a portion of a program including conditional instructions.

FIG. 26 shows an example of assembler code.

DETAILED DESCRIPTION OF THE INVENTION

Referring to the accompanying drawings, the following is a detailed explanation of embodiments of processors, compilers and compilation methods in accordance with the present invention.

Embodiment 1

Processor

Outline of Instruction Format and Architecture

First, the structure of instructions decoded and executed by the processor in accordance with the present invention is explained with FIGS. 1A, 1B and 1C. FIGS. 1A to 1C illustrate the instruction format of the processor. The instructions for this processor have a fixed length of 32 bit, and each instruction includes one bit of parallel execution boundary information (E: end bit) 10. This information indicates whether there is a boundary of parallel execution between that instruction and the instruction that follows. More specifically, if the parallel execution boundary information E is "1," then there is a boundary of parallel execution between that instruction and the instruction that follows, and if the parallel execution boundary information E is "0," then there is no boundary of parallel execution between that instruction and the instruction that follows. An explanation about how this information is utilized follows below.

Each instruction also has three bits of execution condition information (P: predicate) 11. This execution condition information P specifies one of the eight condition flags C0 to C7 (311) in FIG. 5 (explained below) as the condition flag storing the condition for executing that instruction. If the value of the condition flag specified by the execution condition information P is "1," then the operation specified by that instruction is executed, and if the value of the condition flag is "0," then the operation is not executed.

The operation is specified by the remaining 28 bits, that is, the entire length of the instructions except the parallel execution boundary information E and the execution condition information P. More specifically, the fields "Op1," "Op2," and "Op3" specify an operation code indicating the kind of operation, the field "Rs" specifies the register number of the register serving as the source operand, and "Rd" specifies the register number of the register serving as the destination operand. Moreover, the field "imm" specifies a constant operand for computation. The field "disp" specifies a displacement.

Figure 2B:
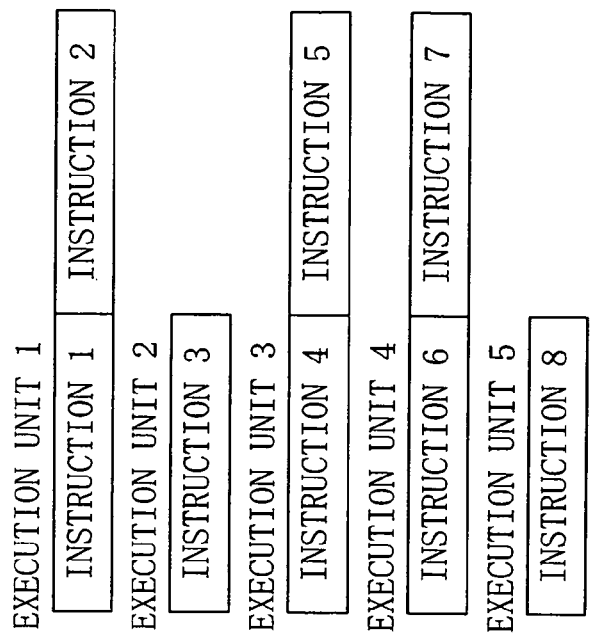
FIGS. 2A and 2B illustrate the principle of how instructions are supplied and issued in that processor.
Figure 2A:
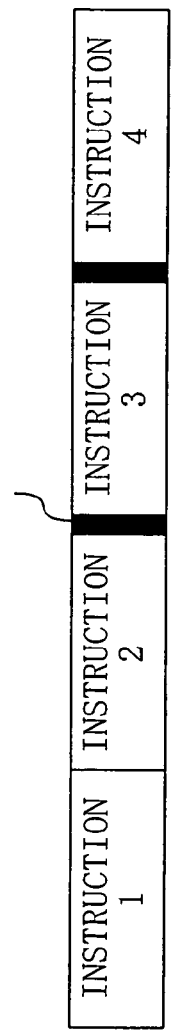

Next, using FIG. 2A and FIG. 2B, an outline of the architecture of the processor is explained. The processor is based on the premise of static parallel scheduling.

As shown in FIG. 2A, instructions are supplied in packets of four instructions, each with a fixed length of 128 bit per cycle, as instruction supply portions (referred to as "packets" in the following). As shown in FIG. 2B, in one cycle, the instructions up to a boundary for parallel execution (referred to as "execution units" in the following) are executed simultaneously. That is to say, in each cycle, the instructions up to the instruction whose parallel execution boundary information E is "1" are executed in parallel. Instructions that have been supplied but not executed remain in the instruction buffer, and are executed in one of the following cycles.

That is to say, with this architecture, instructions are supplied in packet units of fixed length, and based on statically determined information, a suitable number of instructions corresponding to the degree of parallelism is issued in each cycle. With this approach, the no-operation instructions (nop instructions) that occurred with the VLIW approach of ordinary fixed length instructions are completely eliminated, and the code size can be reduced.

Hardware Configuration of the Processor

Figure 3:
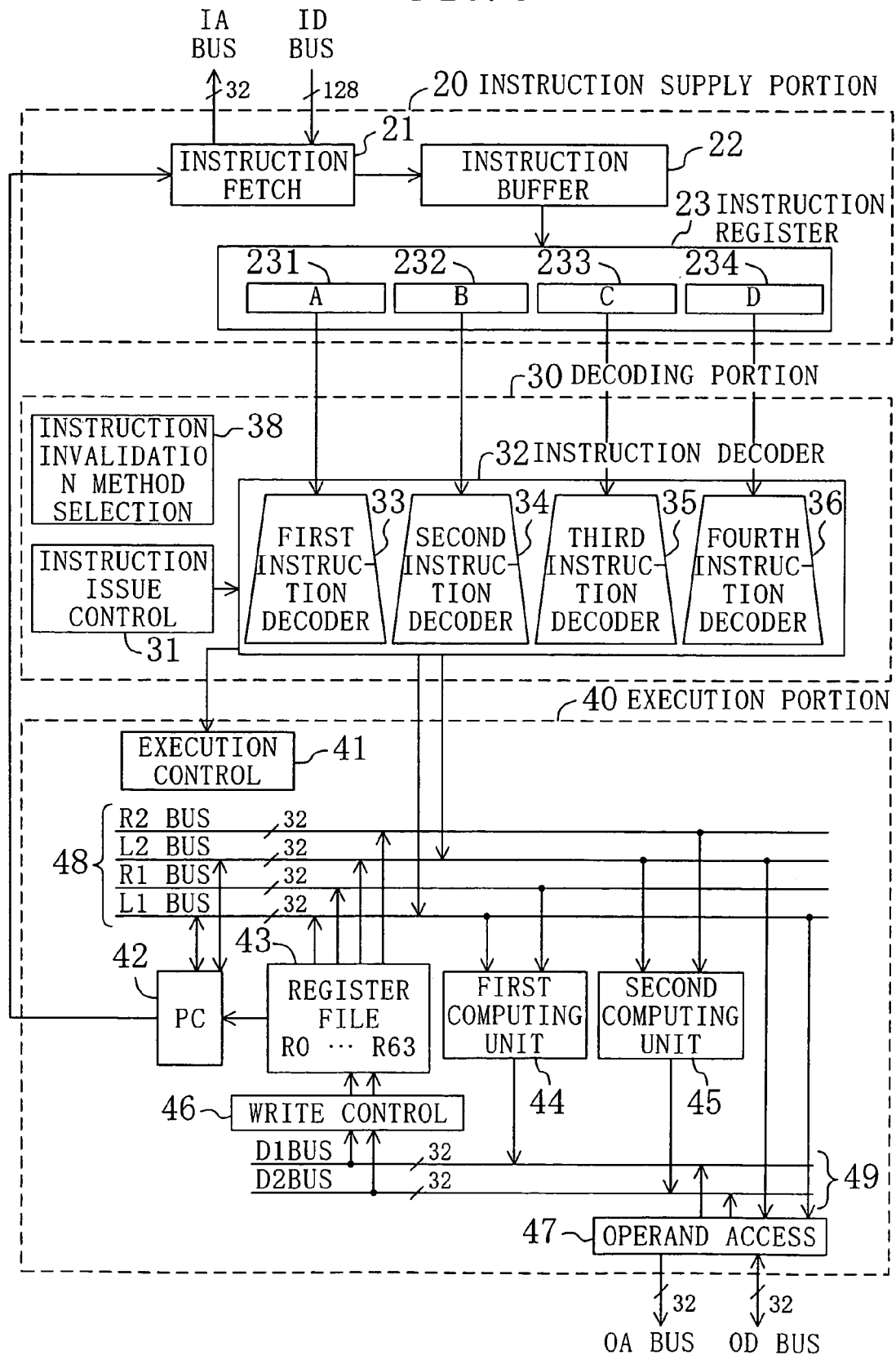
FIG. 3 is a block diagram illustrating the hardware configuration of the processor.

FIG. 3 is a block diagram illustrating the hardware configuration of a processor in accordance with the present invention. This processor is a parallel execution processor having two computing units, and is broadly speaking configured of an instruction supply portion 20, a decoding portion 30 and an execution portion 40.

The instruction supply portion 20 supplies groups of instructions from an external memory (not shown in the drawings), which it outputs to the decoding portion 30, and includes an instruction fetching portion 21, an instruction buffer 22 and an instruction register 23.

The instruction fetching portion 21 fetches blocks of instructions from the external memory (not shown in the drawings) via a 32 bit IA (instruction address) bus and a 128 bit ID (instruction data) bus, and holds them in an internal instruction cash, while it supplies the instruction group corresponding to the address given out by the PC (program counter) portion 42 to the instruction buffer 22.

The instruction buffer 22 is provided with two buffers of 128 bit, and is used to accumulate the instructions supplied by the instruction fetching portion 21. Packets are supplied from the instruction fetching portion 21 to the instruction buffer 22 in units of 128 bit. The instructions accumulated in the instruction buffer 22 are output to the appropriate registers of the instruction register 23.

The instruction register 23 is made of four 32 bit registers 231 to 234, and its purpose is to hold the instructions that are sent from the instruction buffer 22. The instruction register 23 and its environs are shown in more detail in another drawing.

The decoding portion 30 decodes the instructions held by the instruction register 23 and outputs a control signal depending on the decoding result to the execution portion 40. Broadly speaking, the decoding portion 30 is made of an instruction issue control portion 31, an instruction decoder 32 and an instruction invalidation method selection portion 38.

The instruction issue control portion 31 references the execution condition information P in the instructions held in the four registers 231 to 234 of the instruction register 23 as well as the corresponding condition flags, and performs a process of effectively deleting the instructions for which the value of the condition flag is false. However, this is limited to those cases in which the decoding portion 30 is selected by the invalidation method selection portion 38. Furthermore, the instruction issue control portion 31 references the parallel execution boundary information E in the instructions, and performs a control to the effect that for those instructions that exceed the boundary of a parallel execution, an invalidation of that instruction is issued. The operation of the instruction issue control portion 31 is explained in more detail further below with reference to another drawing.

The instruction decoder 32 is a device that decodes the instruction group stored in the instruction register 23, and is made of a first instruction decoder 33, a second instruction decoder 34, a third instruction decoder 35 and a fourth instruction decoder 36. These decoders 33 to 36 in principle decode one instruction per cycle, and give out control signals to the execution portion 40. Furthermore, constant operands placed inside instructions are transferred from the instruction decoders to the data bus 48 of the execution portion 40.

The instruction invalidation method selection portion 38 selects whether instructions for which the condition flag is false and whose execution is not necessary are invalidated by the decoding portion 30 or whether they are invalidated by the execution portion 40. More specifically, if in the condition flag validity information 312 (see FIG. 5) of the later-explained instruction issue control portion 31 the condition flag of that instruction is valid, that is, it is indicated as finalized, then the deletion of invalid instructions is performed with the decoding portion 30, and if not, then the writing of the execution result of that instruction is invalidated with the write control portion 46 of the execution portion 40.

The execution portion 40 is a circuit unit that executes maximally two operations in parallel, based on the decoding result of the decoding portion 30, and includes an execution control portion 41, a PC portion 42, a register file 43, a first computing unit 44, a second computing unit 45, a write control portion 46, an operand access portion 47, and data buses 48 and 49.

The execution control portion 41 is the generic term for all control circuitry and wiring that control the structural elements 42 to 49 of the execution portion 40 based on the decoding result of the decoding portion 30, and includes circuitry for timing control, operation enable/disable control, status management and interrupt control.

The PC portion 42 outputs the address of the external memory (not shown in the drawings) at which the next instruction to be decoded and executed is located to the instruction fetching portion 21 in the instruction supply portion 20.

The register file 43 is made of sixty-four 32-bit registers (R0 to R63). The values stored in these registers are transferred over the data bus 48 to the first computing unit 44 and the second computing unit 45, based on the decoding result of the instruction decoder 32, and after they have been used there for computation or merely passed through, they are sent over the data bus 49 to the register file 43 or the operand access portion 47.

The first computing unit 44 and the second computing unit 45 each incorporate a multiplier or an ALU for performing an arithmetic or logical computation on two 32-bit words, and a barrel shifter for shifting operations, and perform computations under the control of the execution control portion 41.

If the instruction invalidation method selection portion 38 has selected invalidation of an instruction with the execution portion 40, then the write control portion 46 performs a control to the effect that the execution result of that instruction is not written into the register file 43 when the condition flag of that instruction is false. Thus, the result is the same as if that instruction had been executed as a no-operation instruction (nop instruction).

The operand access portion 47 is the circuitry for the transfer of operands between the register file 43 and the external memory (not shown in the drawings). More specifically, when for example "ld" (load) is put in an instruction as the operation code, then the data of one word (32 bit) placed in the external memory is loaded through the operand access portion 47 to the register specified by the register file 43, or when "st" (store) is put as the operation code, then the storage value of the register specified by the register file 43 is stored in the external memory.

As shown in FIG. 3, the PC portion 42, the register file 43, the first computing unit 44, the second computing unit 45, the write control portion 46 and the operand access portion 47 are connected by a data bus 48 (L1 bus, R1 bus, L2 bus and R2 bus) and a data bus 49 (D1 bus and D2 bus). It should be noted that the L1 bus and the R1 bus are connected to the two input ports of the first computing unit 44, the L2 bus and the R2 bus are connected to the two input ports of the second computing unit 45, and the D1 bus and the D2 bus are respectively connected to the output ports of the first computing unit 44 and the second computing unit 45.

Configuration of the Instruction Register 23 and its Environs and Operation of the Instruction Issue Control Portion 31

Figure 4:
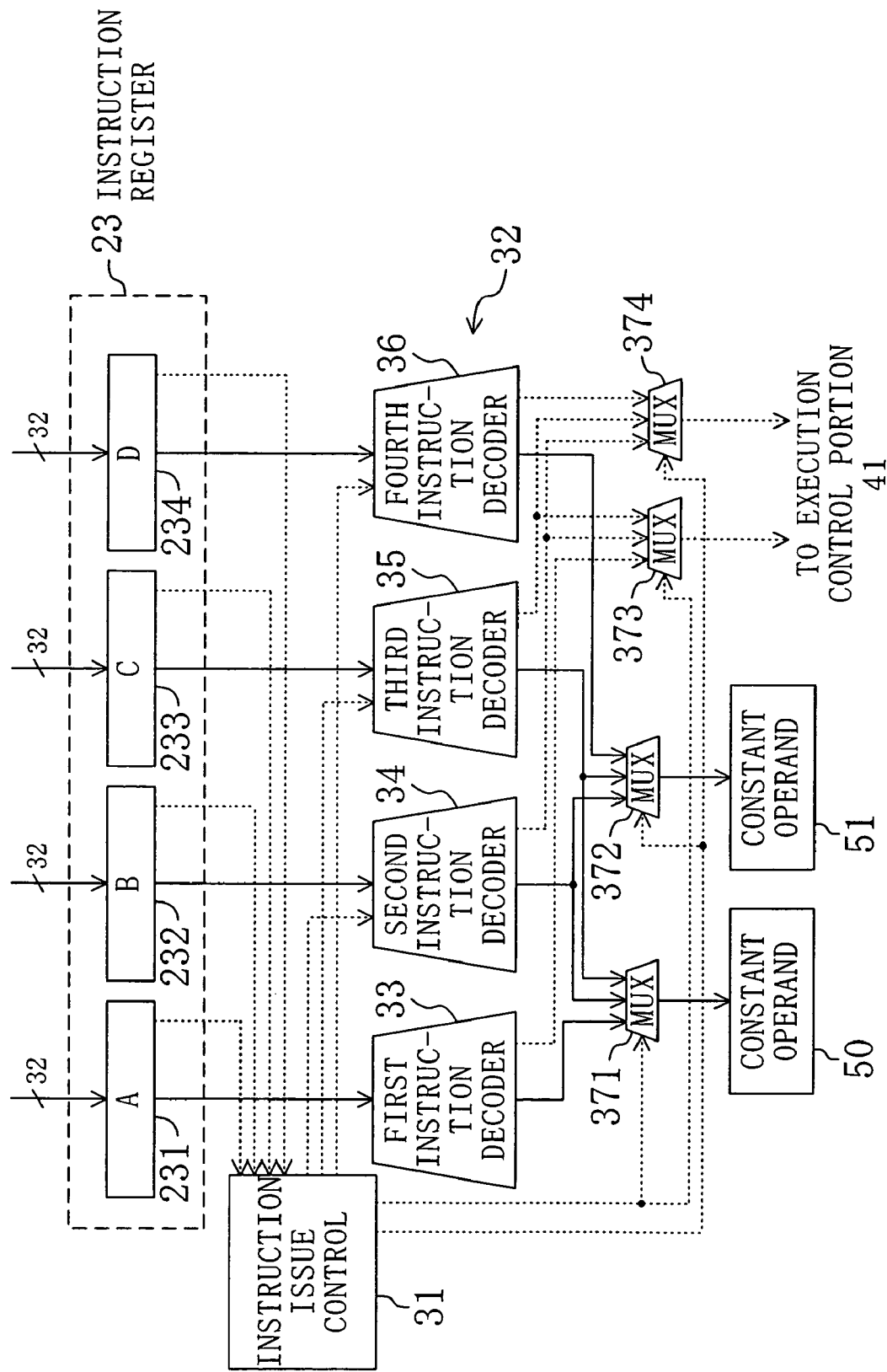
FIG. 4 is a block diagram illustrating the instructions register of the processor and its environs.

FIG. 4 is a block diagram illustrating the configuration of the configuration of the instruction register 23 and its environs. In FIG. 4, the dotted arrows represent control signals.

The instruction register 23 is made of four 32-bit registers, namely an A register 231, a B register 232, a C register 233 and a D register 234. The instruction register 23 supplies the instructions from the instruction buffer 22.

The first to fourth instruction decoders 33, 34, 35 and 36 respectively receive 32-bit instructions as input, decode them, and output control signals regarding the operation of the instructions, and output constant operands put into the instructions. The numerals 50 and 51 in FIG. 4 denote constant operands of instructions whose execution has been finalized.

Furthermore, 1-bit no-operation instruction flags are input into the second to fourth instruction decoders 34, 35 and 36 as control signals. When these flags are set to "1," the decoders output control signals corresponding to a no-operation instruction. That is to say, by setting the no-operation instruction flags, the decoding with the corresponding instruction decoder can be invalidated.

The instruction issue control portion 31 references the information in the instructions stored in the instruction register 23, and performs the generation of the no-operation instruction flags for invalidating the decoding of the instructions beyond the boundary of parallel execution, the control of the execution instruction selectors 371 and 372 for selecting the valid instructions for which the execution condition is true and whose operation should be executed with the execution portion 40, and the control of the execution instruction selectors 373 and 374 for selecting the control signals corresponding thereto.

Figure 5:
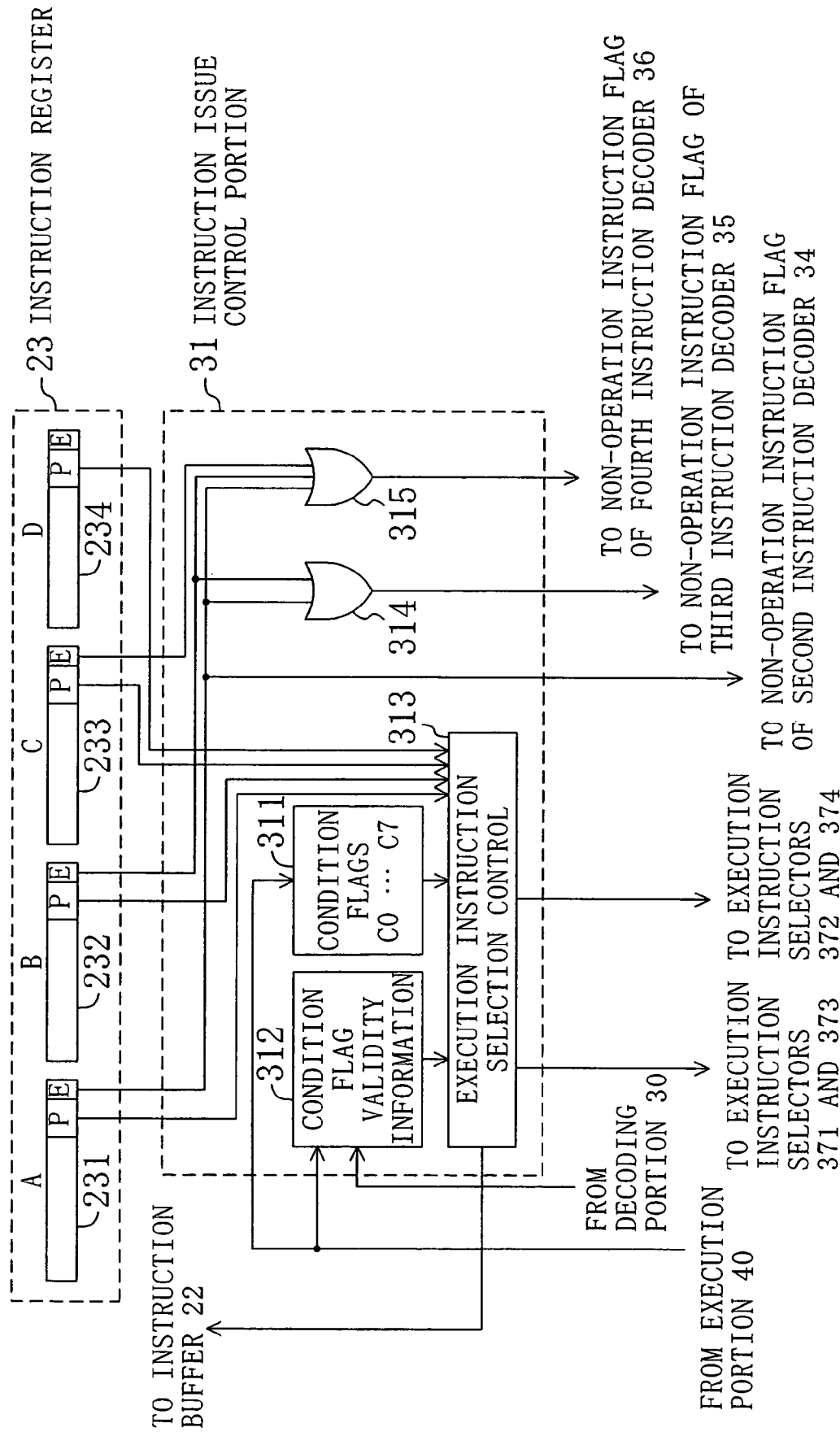
FIG. 5 illustrates the circuit configuration of the instruction issue control portion of the processor and its environs.

FIG. 5 illustrates the configuration of the command issue control portion 31 of this processor and peripheral circuitry thereof. The command issue control portion 31 references the parallel execution boundary information E in the instructions, and decides up to which instruction should be issued in that cycle. Then, by setting the no-operation command flag of the instruction decoder corresponding to the instructions that are not issued during that cycle to "1," the output to that decoder is set to a control signal corresponding to a no-operation instruction. The generation of the no-operation instruction flag can be realized by simple logical circuits (OR gates) 314 and 315 as shown on the right-hand side of the instruction issue control portion 31 in FIG. 5. At the same time, information about how many instructions have remained without being issued is transmitted to the instruction buffer 22.

Explaining this in more detail, if the parallel execution boundary information E of the instruction in the A register 231 is "1," then the decoding of the second, third and fourth instruction decoders 34, 35 and 36 is invalidated. If the parallel execution boundary information E of the instruction in the B register 232 is "1," then the decoding of the third and fourth instruction decoders 35 and 36 is invalidated. And if the parallel execution boundary information E of the instruction in the C register 233 is "1," then the decoding of the fourth instruction decoders 36 is invalidated.

Furthermore, the instruction issue control portion 31 references the execution condition information P in each instruction, and controls the execution instruction selectors 371 to 374 in FIG. 4 such that instructions for which the condition flag is false, that is, instructions that need not be executed, are effectively deleted. In this processor, a maximum of four instructions are decoded in each cycle, but in practice, it is mostly two instructions at best whose operations are executed. Thus, the problem that if the execution condition is false, a no-operation command is executed by the execution portion 40, leading to poor utilization efficiency of the computing units 44 and 45, can be solved.

In order to realize this, the instruction issue control portion 31 is provided with an execution instruction selection control portion 313. The execution instruction selection control portion 313 looks up to which of the eight condition flags (C0 to C7) 311 the execution condition information P specified in the instruction corresponds, and thus detects the instructions for which it is not necessary to execute the operation, and not selecting these instructions, controls the execution instruction selectors 371 to 374 such that the next valid instruction is selected. The not selected instructions are effectively deleted. The condition flags 311 include eight 1-bit registers C0 to C7, which are specified by decoding the 3-bit execution condition information P within each instruction. It should be noted that the value of the condition flag C7 is always "1," and for instructions that are always executed, C7 is specified as the execution condition. The specification of C7 can be left out in the notation of the program.

However, in instructions in which the condition flag is updated, the execution stage, that is, the execution portion 40, is where the condition flag is finalized, so that if in the previous cycle an instruction is executed in which a certain condition flag is updated, this condition flag is not finalized in the decoding stage, that is, the decoding portion 30, of the following cycle, and it cannot be judged whether the instruction can be deleted or not. The condition flag validity information 312 is provided in order to detect this situation.

The condition flag validity information 312 holds for each condition flag one bit indicating whether the value of that condition flag is valid or not. When it is judged by the decoding portion 30 that an instruction is executed that updates a certain condition flag, then the validity information for that condition flag is set to "0," and when the value of that condition flag has been updated by the execution portion 40, then the validity information of that condition flag is set to "1."

After the execution condition information P of each instruction has been referenced, the instruction issue control portion 31 references the condition flag validity information 312, and detects whether the values of the condition flags corresponding to the execution conditions are valid or not. Then, if they are not valid, that is, if the corresponding bit of the condition flag validity information 312 is "0," then the corresponding instruction is not deleted. The corresponding instruction is issued to the execution portion 40 as it is, and the writing of the execution result of that instruction is invalidated if necessary, after the condition flag has been finalized.

If the value of the condition flag is valid, that is, if the corresponding bit of the condition flag validity information 312 is "1," then the one bit in the condition flags 311 specified by the execution condition information P of that instruction is referenced, and if that value is "1," then that instruction is issued as it is to the execution portion 40, and if that value is "0," then the execution instruction selectors 371 to 374 are controlled such that the instruction is effectively deleted.

This means, that if the execution condition information P of a certain instruction is "0," and if the corresponding condition flag is updated in the directly preceding instruction, then the execution result of that instruction is invalidated in the execution portion 40, and if not, then the instruction is effectively deleted in the decoding portion 30.

Figure 6:
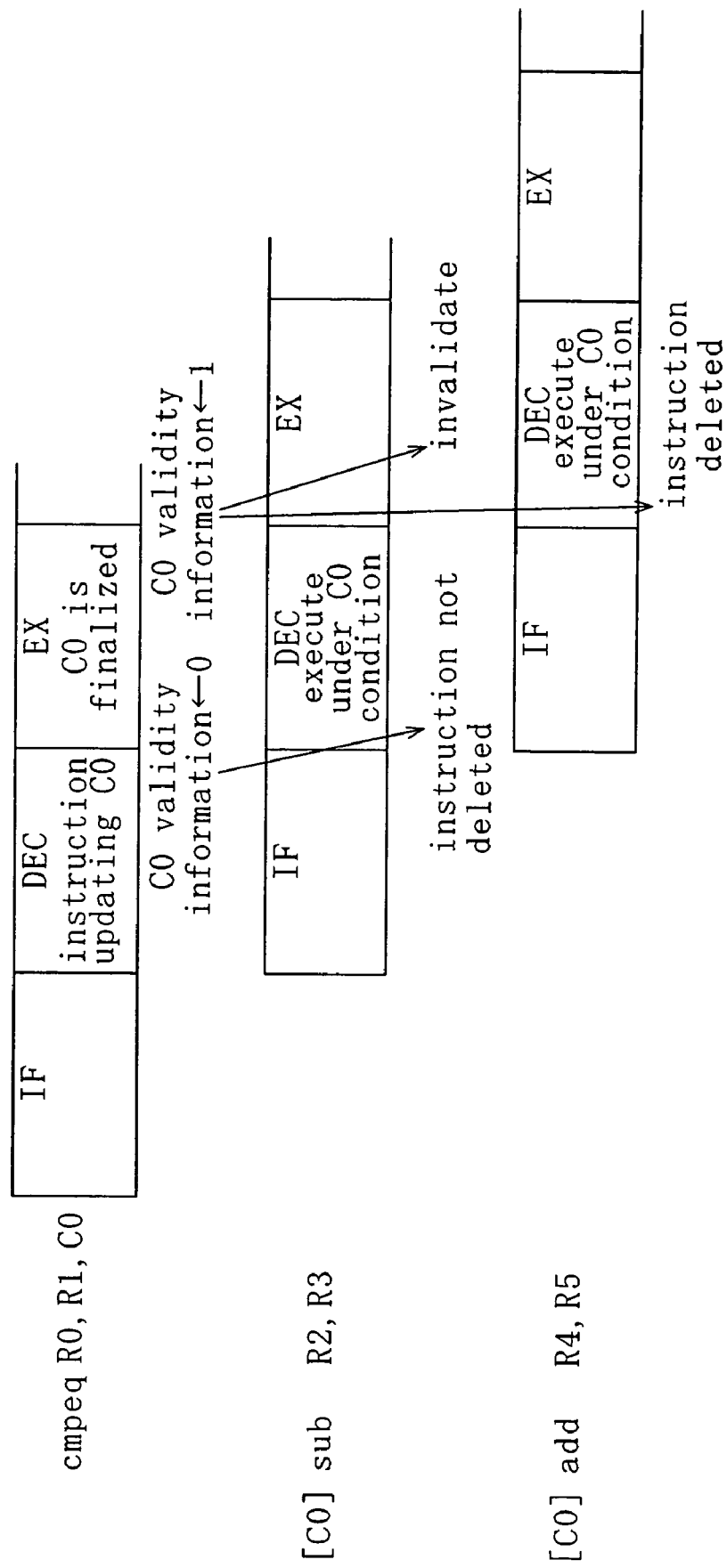
FIG. 6 illustrates the timing of the pipeline when a sequence of instructions is executed on the processor.

FIG. 6 shows the timing of the pipeline process when executing a specific sequence of instructions. Here, it is assumed that, starting at the top, three instructions are executed one by one. The first instruction is a comparison instruction that compares the content of register R0 with the content of register R1, and sets the condition flag C0 to "1" if the two are identical, and sets it to "0" if not. The next instruction is a subtraction instruction that subtracts the content of register R2 from the content of register R3 if the content of the condition flag C0 is "1," and writes the result into register R3. The last instruction is an addition instruction that adds the content of register R4 to the content of register R5 if the content of the condition flag C0 is "1," and writes the result into register R5.

In FIG. 6, the timing of the instruction fetch stage (IF), the decoding stage (DEC) and the execution stage (EX) of the various instructions is shown to the right of the instructions. Here, it is assumed that the result of the first comparison instruction is false, that is, that C0 has turned "0."

As can be seen in FIG. 6, the decoding stage (DEC) of the first comparison instruction detects that it is an instruction that updates C0, the validity information of C0 is set to "0," and after the comparison result has been finalized, the execution stage (EX) sets the validity information of C0 to "1."

The subsequent subtraction instruction and addition instruction are both instructions that are executed with C0 as the condition, but because for the subtraction instruction that immediately follows the comparison instruction the value of C0 is not valid at the decoding stage (DEC), the instruction is not deleted, but is issued to the execution stage (EX), and the execution result is invalidated at that stage. On the other hand, for the addition instruction, the value of C0 has been finalized at the decoding stage (DEC), so that the instruction is effectively deleted by the decoding stage (DEC), and is not issued to the execution stage (EX). In this case, the empty computing unit can be utilized for the instruction following the addition instruction.

If instructions are not issued and remain after the invalidation of the instruction by the above-described control, then the instruction issue control portion 31 transmits the number of remaining instructions to the instruction buffer 22, and these instructions are not invalidated in the instruction buffer 22, but transferred again to the instruction register 23 in the next cycle.

Thus, taking an instruction format as shown in FIG. 1, and adopting the configuration shown in FIG. 4 and FIG. 5, an instruction issue control that advantageously utilizes the computing units can be carried out.

Operation of the Processor

The following is an explanation of the operation of the processor of the present embodiment for the decoding and execution of specific instructions.

Figures 7, 8:
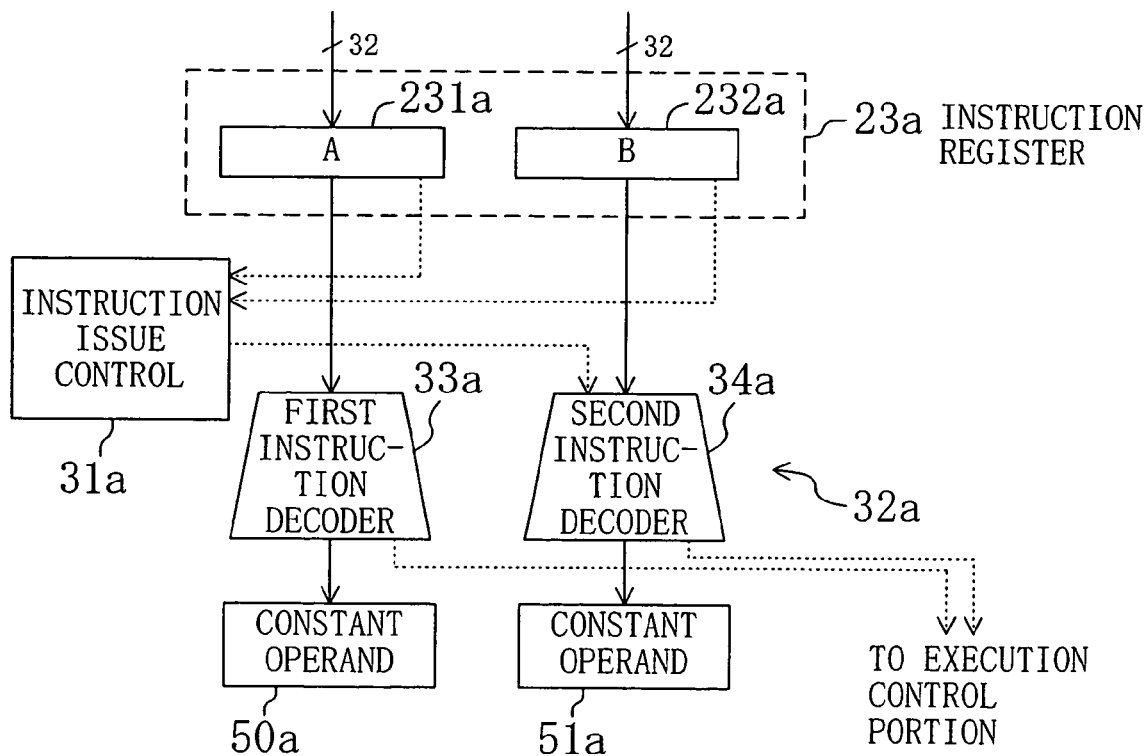
FIG. 7 shows a portion of a program including conditionally executed instructions.
FIG. 8 is a block diagram showing the instruction register environs of a processor having a conventional instruction issue control portion.

FIG. 7 shows a portion of a program including conditional execution. This program has five instructions, whose content is given in mnemonic notation. In particular, the mnemonic "add" represents the addition of a constant or the storage value of a register to the storage value of a register, the mnemonic "sub" represents the subtraction of a constant or the storage value of a register from the storage value of a register, the mnemonic "st" represents the transfer of the storage value of a register into memory, and the mnemonic "mov" represents the transfer of a constant or the storage value of a register into a register.

Furthermore, "Rn (n=...63)" indicates one of the registers in the register file 43. The parallel execution boundary information E of each instruction is given as "0" or "1." Moreover, condition flags specified by the execution condition information P are given in square brackets "[ ]" preceding the instructions. Instructions for which no condition flags are given are always executed.

The following is an explanation of the operation of this processor for each execution unit. It is assumed that at the beginning, the value of the condition flag C0 has been finalized to "1" and the value of C1 to "0."

Execution Unit 1

A packet including instruction 1, instruction 2, instruction 3 and instruction 4 is supplied from the external memory, and the instructions are transferred to the instruction register 23. Then, the instruction issue control portion 31 references the parallel execution boundary information E of each instruction. In this case, the parallel execution boundary information of instruction 3 is "1," so that the decoding result of the fourth instruction decoder 36 is invalidated, that is, it is set to a no-operation instruction.

Next, the instruction issue control portion 31 references the execution condition information P of each instruction. The execution condition flag of instruction 1 is C0, and the value of C0 has been finalized to "1," so that the selection of the operands is controlled by the execution instruction selector 371 such that instruction 1 is executed as the first instruction, and the execution instruction selector 373 is controlled such that the decoding result is selected. Next, the execution condition flag of instruction 2 is C1, and the value of C1 has been finalized to "0," so that instruction 2 is effectively deleted, and its operation is not executed. Then, since the following instruction 3 is always executed, the selection of the operand is controlled by the execution instruction selector 372 such that instruction 3 is executed as the second instruction and the execution instruction selector 374 is controlled such that the decoding result is selected. As a result instruction 1 and instruction 3 are sent to the execution portion 40 as instructions to be executed, and instruction 4, which has not been issued, remains in the instruction buffer 22.

In the execution portion 40, the value resulting from adding 1 to the value stored in register R0 is stored in register R0, and the value resulting from adding the value stored in register R1 to the value stored in register R2 is stored in register R2.

Execution Unit 2

Instruction 4 that has remained in the instruction buffer 22 and instruction 5 that has been supplied newly from the external memory are transferred to the instruction register 23. Then, the instruction issue control portion 31 references the parallel execution boundary information E of each instruction. In this case, the parallel execution boundary information of instruction 5 is "1," so that the decoding result of the third instruction decoder 35 and the fourth instruction decoder 36 is invalidated, that is, it is set to a no-operation instruction.

Instruction 4 and instruction 5 are both always executed, so that the execution instruction selectors 371 to 374 are controlled such that instruction 4 is sent as the first instruction and instruction 5 is sent as the second instruction to the execution portion 40. Thus, all instructions that have been supplied are issued.

In the execution portion 40, the value stored in register R0 is transferred to the address indicated in register R3 in the external memory, and the value stored in register R2 is transferred to register R4.

As described above, the program shown in FIG. 7 is executed in two execution units in the processor. In the processor, the number of instructions that are decoded can be larger than the number of computing units 44 and 45, and unnecessary instructions can be deleted as appropriate, so that an efficient utilization of the computing units 44 and 45 can be achieved. Also in this example, two operations are executed in the execution portion 40 in each cycle, and the provided computing units 44 and 45 are utilized efficiently.

Comparison to Processor Having a Conventional Instruction Issue Control Portion

Next, the performance of the processor in accordance with the present invention is compared to the performance of the process shown in FIG. 7 on a processor as described in the prior art section, which issues all conditional execution instructions to the execution portion and invalidates as suitable in the execution portion.

FIG. 8 is a block diagram showing the configuration of the instruction registers of a conventional processor and their environs. Like the processor of the present invention, this conventional processor is provided with two computing units, and the instruction format is the same as the instruction format for the processor of the present invention in FIG. 1. Since the processor can perform two parallel processes, the instruction register 23a is provided with an A register 231a and a B register 232a, and the instruction decoder 32a is provided with a first instruction decoder 33a and a second instruction decoder 34a. The numerals 50a and 51a denote constant operands. The instruction issue control portion 31a invalidates the decoding result of the second instruction decoder 34a in accordance with the parallel execution boundary information E of the instruction stored in the A register 231a.

Figures 9, 10, 11:
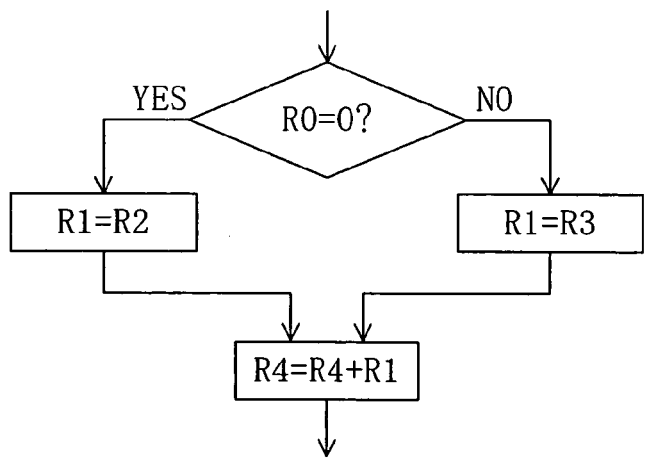
FIG. 9 illustrates shows the program when the process of the program in FIG. 7 is carried out on a processor having a conventional instruction issue control portion.
FIG. 10 shows a process flow including a conditional branch.
FIG. 11 shows a program in which the process flow in FIG. 10 is annotated in conditional execution format.

FIG. 9 shows the program that can execute the process of the program shown in FIG. 7 with a processor having a conventional instruction issue control portion 31a. The program of FIG. 9 is the same as the program in FIG. 7, except for the parallel execution boundary information E. The parallel execution boundary information E is set such that at most two instructions are executed simultaneously.

The following is an explanation of the operation of the conventional processor for each execution unit. It is assumed that at the beginning, the value of the condition flag C0 has been finalized to "1" and the value of C1 to "0."

Execution Unit 1

A packet including instruction 1, instruction 2, instruction 3 and instruction 4 is supplied from the external memory, and instructions 1 and 2 are transferred to the instruction register 23a. Then, the instruction issue control portion 31a references the parallel execution boundary information E of instruction 1 stored in the A register 231a. In this case, the parallel execution boundary information of instruction 1 is "0," so that the decoding result of the second instruction decoder 34a is not invalidated. Consequently, both instruction 1 and instruction 2 are sent to the execution portion. Instructions 3 and 4, which have not been issued, remain in the instruction buffer.

Since C0, which is the execution condition flag of instruction 1, is "1," the execution portion stores the value resulting from adding 1 to the value stored in register R0 in register R0. And since C1, which is the execution condition flag of instruction 2, is "0," the execution corresponding to instruction 2 is not executed, or the result is invalidated after execution, so that the result is the same as if a no-operation instruction is executed.

Execution Unit 2

Instruction 3 and instruction 4, which have remained in the instruction buffer, are transferred to the instruction register 23a, and instruction 5 is newly supplied from the external memory. Then, the instruction issue control portion 31a references the parallel execution boundary information E of instruction 3 stored in the A register 231a. In this case, the parallel execution boundary information E of instruction 3 is "0," so that the decoding result of the second instruction decoder 34a is not invalidated. Consequently, both instruction 3 and instruction 4 are sent to the execution portion. Instruction 5, which has not been issued, remains in the instruction buffer 22.

Since both instruction 3 and instruction 4 are always executed, the execution portion executes the operations for those two instructions. More specifically, the value obtained by adding the value stored in register R1 to the value in register R2 is stored in register R2, and the value stored in register R0 is transferred to the address in the external memory that is indicated by register R3.

Execution Unit 3

Instruction 5, which has remained in the instruction buffer, is transferred to the instruction register 23a. Then, the instruction issue control portion 31a references the parallel execution boundary information E of instruction 5 stored in the A register 231a. In this case, the parallel execution boundary information E of instruction 5 is "1," so that the decoding result of the second instruction decoder 34a is invalidated. Consequently, only instruction 5 is issued. Thus, all supplied instructions have been issued.

Since instruction 5 is always executed, the operation corresponding to instruction 5 is executed by the execution portion. More specifically, the value stored in register R2 is transferred to register R4.

As described above, the program of FIG. 9 is executed in three execution units by a processor having a conventional instruction issue control portion 31a, and one more execution unit than in the processor of the present invention needs to be executed. This is due to the fact that with a processor having the conventional instruction issue control portion 31a, if the condition of a conditionally executed instruction is false, then that instruction is executed as a no-operation instruction, and the provided computing units are used ineffectively.

Embodiment 2

Compiler

The following is an explanation of an embodiment relating to a compiler for generating code to be executed with a processor according to the above-described Embodiment 1 and a compilation method.

DEFINITION OF TECHNICAL TERMS

First, various technical terms used here are defined.

Object Code

A machine language program for the target processor including rearrangeable information. Object code can be converted into executable code by linking and defining undefined addresses.

Predecessor

An instruction that needs to be executed before executing a certain instruction.

Execution Group

A group of instructions that have been grouped together by the compiler as instructions that can be executed in parallel in the same cycle.

Basic Block

A sequence of instructions that is executed from start to end. It is not possible to leave a block midway, or to enter a block midway.

Target Processor

The processor serving as the target for the compiler is a processor as explained in Embodiment 1. The processor generates execution groups by referencing the parallel execution boundary information E added by the compiler, and does not judge on the hardware level whether parallel execution is possible. Consequently, the compiler must guarantee that simultaneously executable instructions are properly placed between the parallel execution boundaries, that is, within the execution groups. The constraints on the instructions that can be placed between parallel execution boundaries are:

(1) The total number of instructions per parallel execution group cannot exceed four (restriction on instruction decoders);

(2) The number of instructions per parallel execution group whose operation is actually executed by the execution portion cannot exceed two (restriction on the number of executed instructions);

(3) The sum of the processor resources actually used by the execution portion per parallel execution group cannot exceed that for two ALU units, one memory access unit and one branch unit (restriction on computing units).

Instructions can be executed in parallel only if these three restrictions are met.

Configuration of the Compiler

Figure 12:
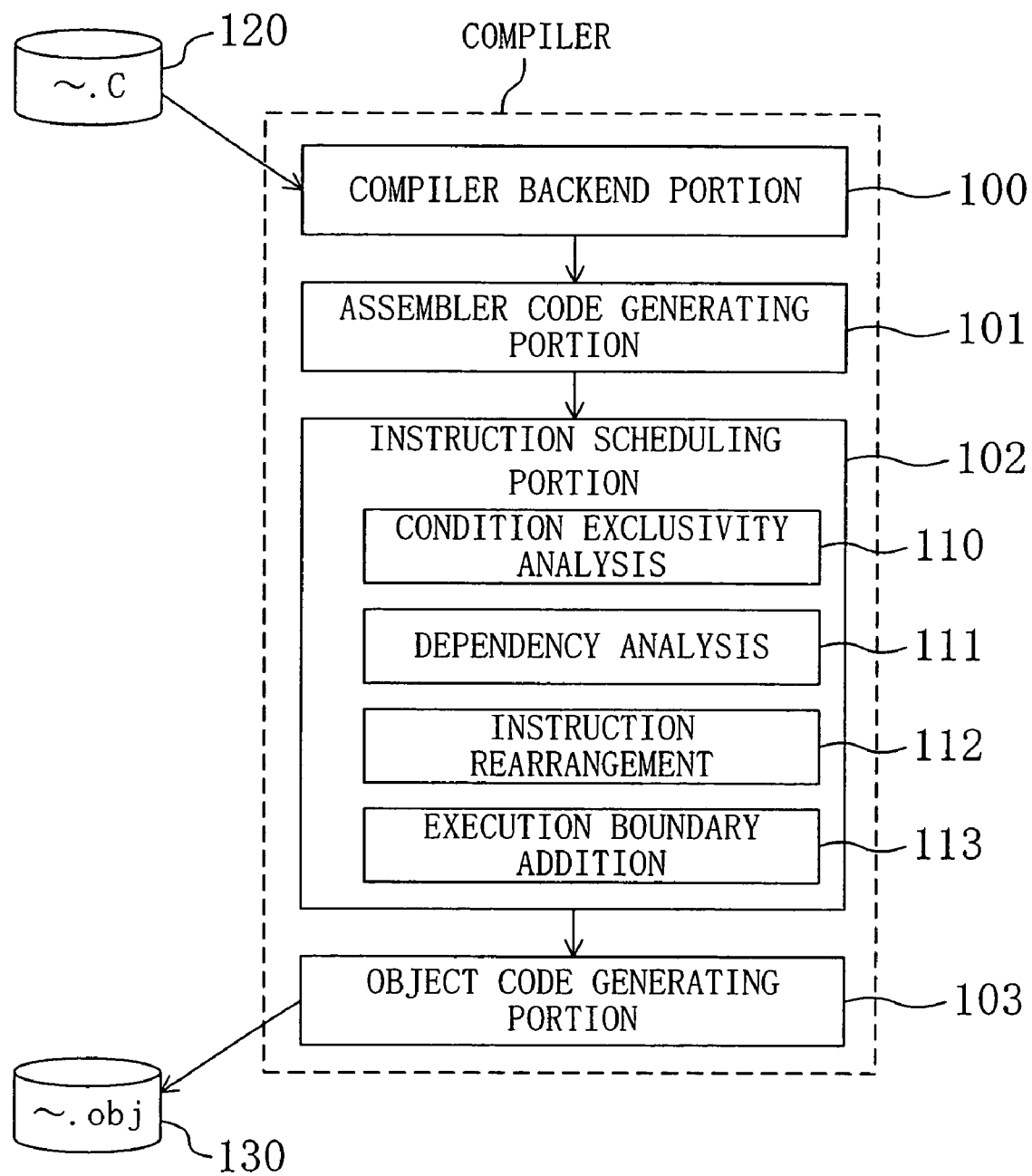
FIG. 12 is a block diagram illustrating the configuration of a compiler according to Embodiment 2 of the present invention and related data.

FIG. 12 is a block diagram illustrating the configuration of a compiler according to Embodiment 2 of the present invention and related data. This compiler is a program processing device that generates object code 130 from source code 120 written in a high-level language, and includes a compiler backend portion 100, an assembler code generating portion 101, an instruction scheduling portion 102, and an object code generating portion 103.

The compiler backend portion 100 reads in high-level language source code 120 that is saved in file format, and performs syntax analysis and semantic analysis to generate internal format code. If necessary, it optimizes the internal format code such that the size and the execution time of the eventually generated executable code are shortened.

The assembler code generating portion 101 generates assembler code from the internal format code that has been generated and optimized by the compiler backend portion 100.

The processes of the compiler backend portion 100 and the assembler code generating portion 101 are not the main concern of the present invention, and since they are equivalent to the processes performed on conventional compilers, their further explanation has been omitted.

Instruction Scheduling Portion 102

The instruction scheduling portion 102 analyzes the assembler code that has been generated by the assembler code generating portion 101 with regard to exclusivity between the conditions associated with the instructions, analyzes the code with regard to dependencies among the instructions, rearranges the instructions (changes the order of the instructions) and adds parallel execution boundaries, parallelizing the assembler code for the target processor. The instruction scheduling portion 102 includes a condition exclusivity analysis portion 110, a dependency analysis portion 111, an instruction rearrangement portion 112 and an execution boundary addition portion 113.

In the instruction scheduling portion 102, the condition exclusivity analysis portion 110 is operated first. After that, the dependency analysis portion ill, the instruction rearrangement portion 112 and the execution boundary addition portion 113 are operated for each basic block. The operation of each portion is explained in detail below.

The condition exclusivity analysis portion 110 analyzes the exclusivity of the condition flags, and generates a condition exclusivity information table for the start of each basic block and for each instruction that updates the condition flags. A condition exclusivity information table is an array with information for all combinations of condition flags about whether the conditions are mutually exclusive. A specific example of a condition exclusivity information table is shown in FIG. 16. Here, an information table in which none of the combinations of condition flags are exclusive is referred to as a "non-exclusive table."

Figure 13:
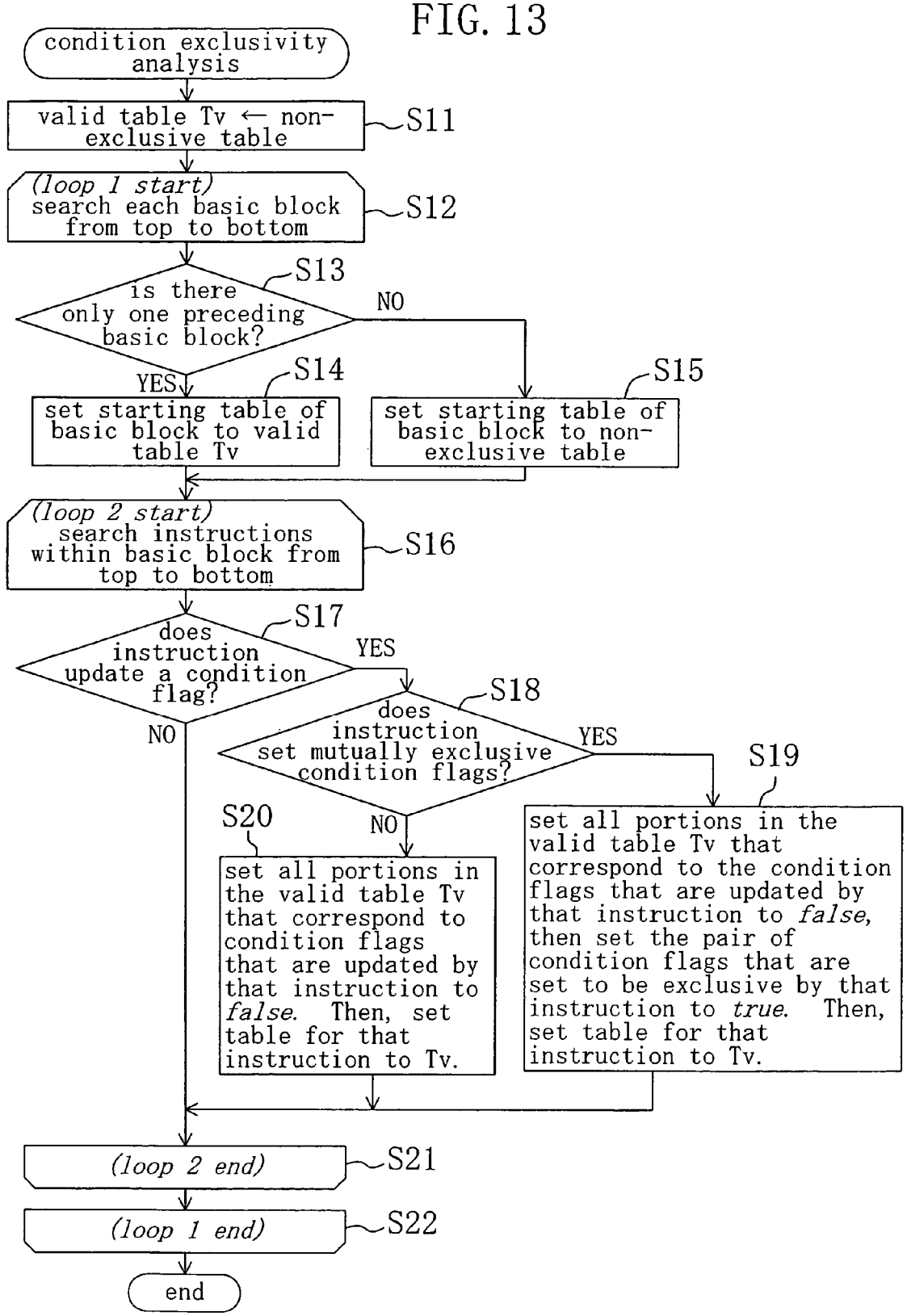
FIG. 13 is a flowchart of the procedure performed by the condition exclusivity analysis portion of that compiler.

FIG. 13 is a flowchart of the procedure performed by the condition exclusivity analysis portion 110. The condition exclusivity analysis portion 110 searches the intermediate code in the compiler corresponding to the instructions from top to bottom and sets the condition exclusivity information table for the start of each basic block and for each instruction that updates the condition flags.

First, a valid table Tv that is valid at that time is initialized to the non-exclusive table (Step S11). Then, each basic block is searched from top to bottom (Step S12).

If the result of the judgment for a certain basic block (Step S13) is that there is only one basic block directly preceding that basic block, then that basic block's starting table is set to the valid table Tv (Step S14), and if not, then the exclusivity relations cannot be specified at that point, so that that basic block's starting table is set to the non-exclusive table (Step S15).

Next, the instructions within the basic block are searched (Step S16). When an instruction updating a condition flag, such as a comparison instruction, is found (Step S17), then it is judged whether this instruction sets mutually exclusive conditions (Step S18). An instruction setting mutually exclusive conditions is for example the comparison instruction 1 in FIG. 11, which updates the condition flags C0 and C1.

If the instruction sets mutually exclusive conditions, then first all portions in the valid table Tv that correspond to condition flags that are updated by that instruction are set to false, and then the pair of condition flags that are set to be exclusive by that instruction is set to be true. Then, the exclusive information table for that instruction is set to the valid table Tv (Step S19).

If the instruction does not set mutually exclusive conditions, then the exclusivity regarding the condition flags updated by that instruction is destroyed, so that all portions in the valid table Tv that correspond to condition flags that are updated by that instruction are set to false. Then, the exclusive information table for that instruction is set to the valid table Tv (Step S20).

The above procedure is repeated for each basic block (Steps S21, S22). Thus, it is possible to save for the start of all basic blocks and for all instructions in which condition flags are set information regarding the exclusivity of the condition flags at that point.

The dependency analysis portion 111 analyzes the dependencies between instructions included within the processing range, and expresses them as a dependency graph. There are the following three ty pes of dependencies between instructions. Since for any instructions that are in a dependency relation the meaning of the program becomes different when the original order of instructions is changed, it is necessary that the dependencies are preserved when changing the instruction order.

Data Dependency

Dependency between an instruction defining a certain resource and an instruction referencing that resource.

Reverse Dependency

Dependency between an instruction that references a certain resource and an instruction that defines that resource.

Output Dependency

Dependency between an instruction defining a certain resource and an instruction defining that same resource.

The dependency analysis portion 111 generates a corresponding node for each instruction included in the processing range, and generates a corresponding edge for each dependency, thus generating a dependency graph. Herein, if two instructions that are dependent upon one another with respect to referencing or defining resources, and the execution conditions of these instructions are mutually exclusive, that is, if it can be guaranteed that they are not satisfied at the same time, then it is not possible that these two instructions both reference or define a resource, so that there is no dependency relationship between the two instructions. Consequently, no edge is generated between the nodes corresponding to these two instructions.

Figure 14:
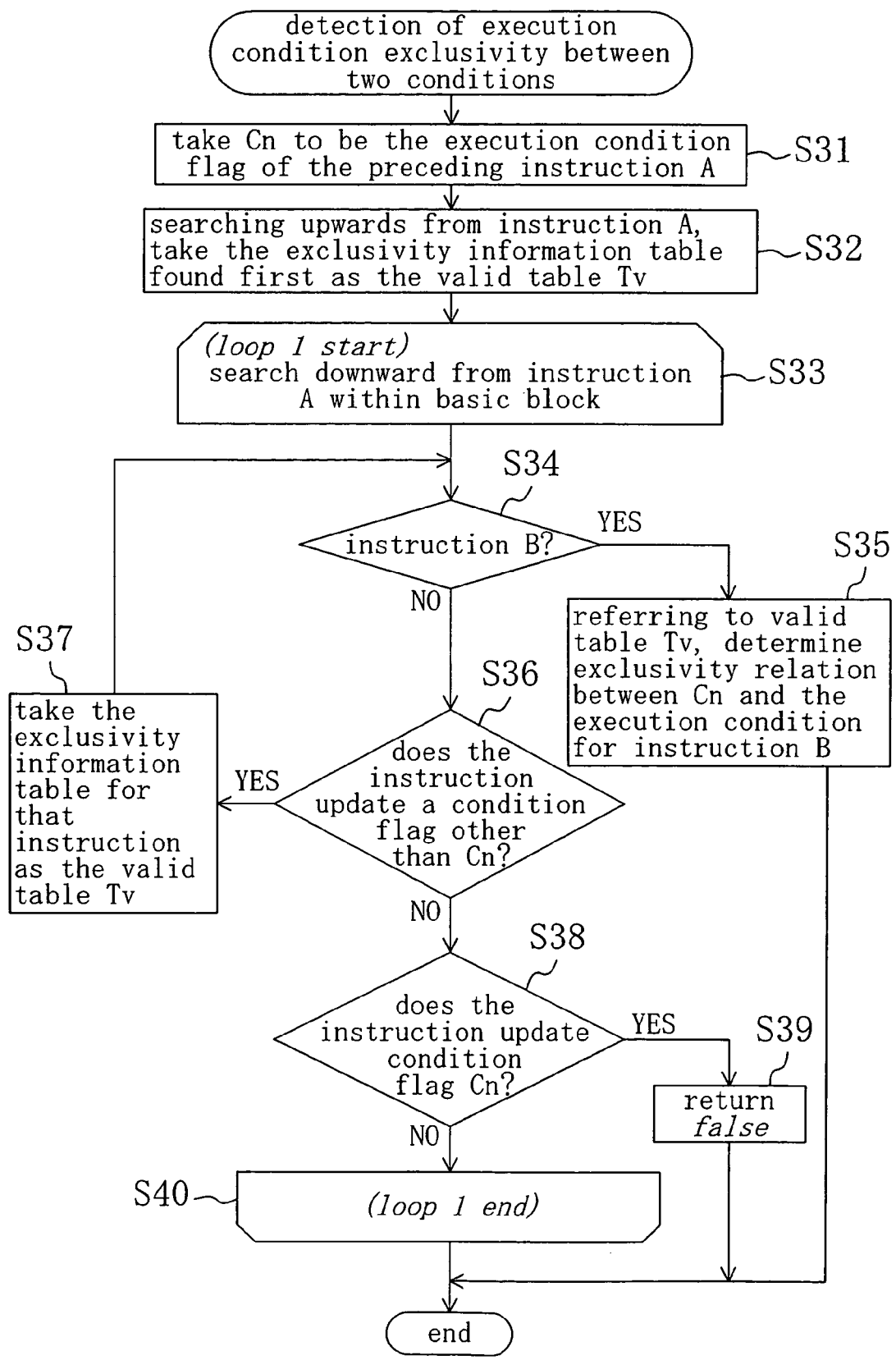
FIG. 14 is a flowchart of the procedure performed by the compiler to detect execution condition exclusivity between two instructions.

In order to realize this, for a preceding instruction A and an instruction B, it is necessary to detect whether the execution conditions of the two instructions are exclusive, by utilizing the exclusivity information table set with the condition exclusivity analysis portion 110. An algorithm for detecting this exclusivity is shown in FIG. 14.

First, Cn is taken to be the execution condition flag of the instruction A (Step S31). Then, in order to determine the exclusivity information that is valid at the time of execution of the instruction A, the procedure either searches upwards from the instruction A to find the instruction at which a condition flag is updated, or when it has reached the start of a basic block, the corresponding exclusivity information table is taken as the valid table Tv (Step S32).

Next, in order to trace the path to instruction B, the procedure searches from instruction A downwards (Step S33). When instruction B has been found (Step S34), the valid table Tv at that time is referenced to determine the exclusivity relation between the condition flag Cn and the execution condition of instruction B, and after that the procedure ends (Step S35). If an instruction updating a condition flag other than Cn is found (Step S36), then the valid table Tv is updated to the exclusivity information table corresponding to that instruction, and the procedure is continued (Step S37). If an instruction updating the condition flag Cn has been found (Step S38), then false is returned, because exclusivity cannot be guaranteed (Step S39). The above process is repeated (Step S40).

As described above, the dependencies between the instructions are built by analyzing both the resource definition and reference relation and the exclusivity of execution conditions.

As a specific example, the application of the condition exclusivity analysis portion 110 and the dependency analysis portion 111 to the assembler code shown in FIG. 15 is explained.

FIG. 16 shows the condition exclusivity information table corresponding to instruction 2 (comparison instruction) of the assembler code in FIG. 15. The condition exclusivity information table is an array showing the exclusivity for all combinations of the condition flags C0 to C7. In this case, instruction 2 sets the condition flag C0 and the condition flag C1 so that they are mutually exclusive.

Figure 17:
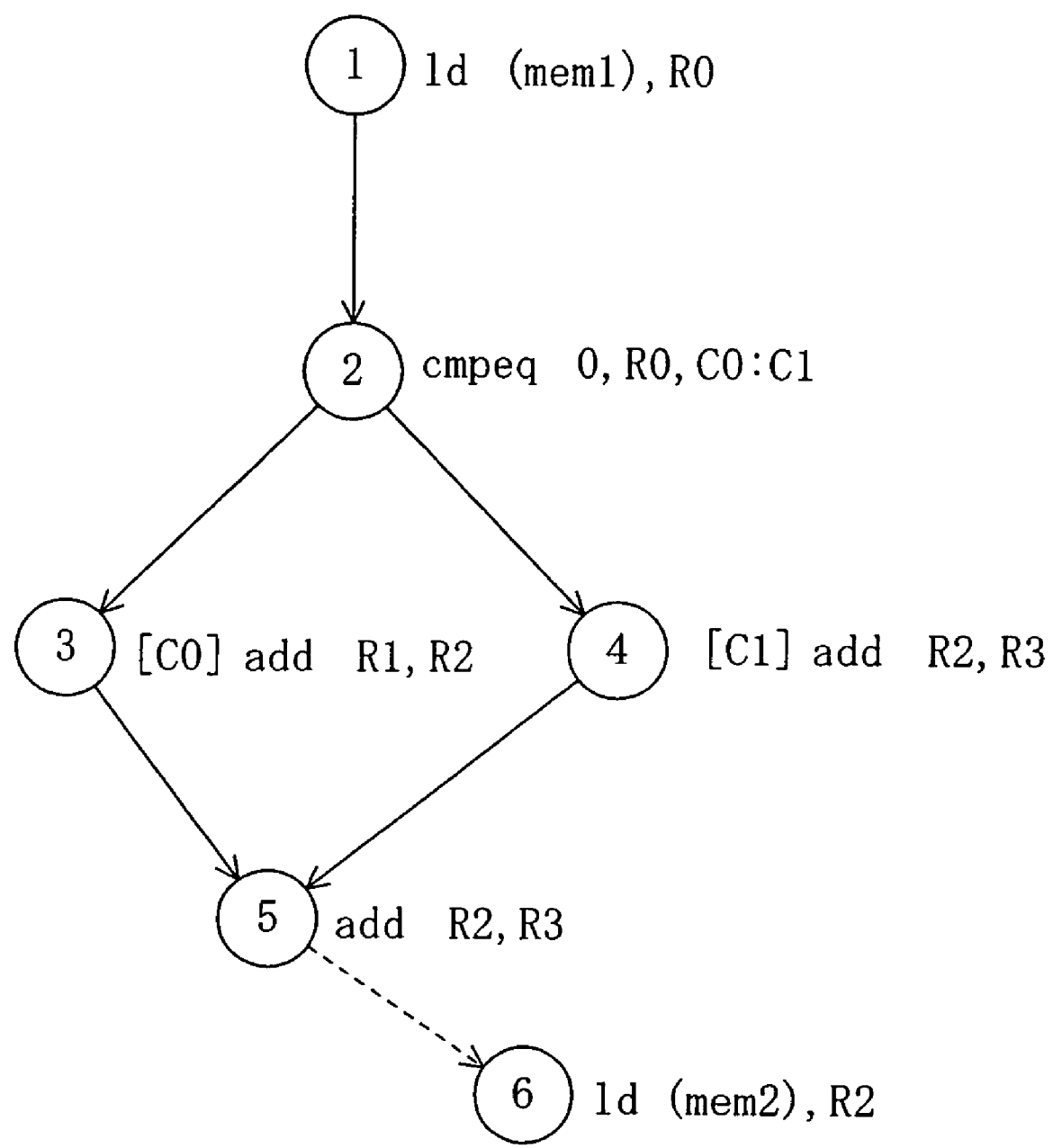
FIG. 17 is a dependency graph corresponding to FIG. 15.

FIG. 17 shows the dependency graph that is output by the dependency analysis portion 111. In FIG. 17, solid lines represent data dependencies and the broken lines represents a reverse dependency. Instruction 2 (comparison instruction) references register R0, which is updated by instruction 1, so that there is a data dependency. Instruction 3 and instruction 4 reference the condition flags C0 and C1, which are updated by instruction 2, so that there is a data dependency. Here, register R2 is updated by instruction 3 and register R2 is referenced by instruction 4, so that at first glance, one might think that there is a data dependency from instruction 3 to instruction 4. However, C0 and C1, which are the execution conditions for these instructions, have been set as exclusive conditions by instruction 2, so that by referencing the condition exclusivity information table shown in FIG. 16, it becomes clear that the two instructions will not both be executed, and thus there is no dependency between these two instructions.

Returning to the explanation of FIG. 12, the instruction rearrangement portion 112 changes the order of the instructions in the processing range using the dependency graph generated with the dependency analysis portion 111, and generates assembler code that is parallelized for the target processor. The details of the processing of the instruction rearrangement portion 112 are as explained in the following.

Figure 18:
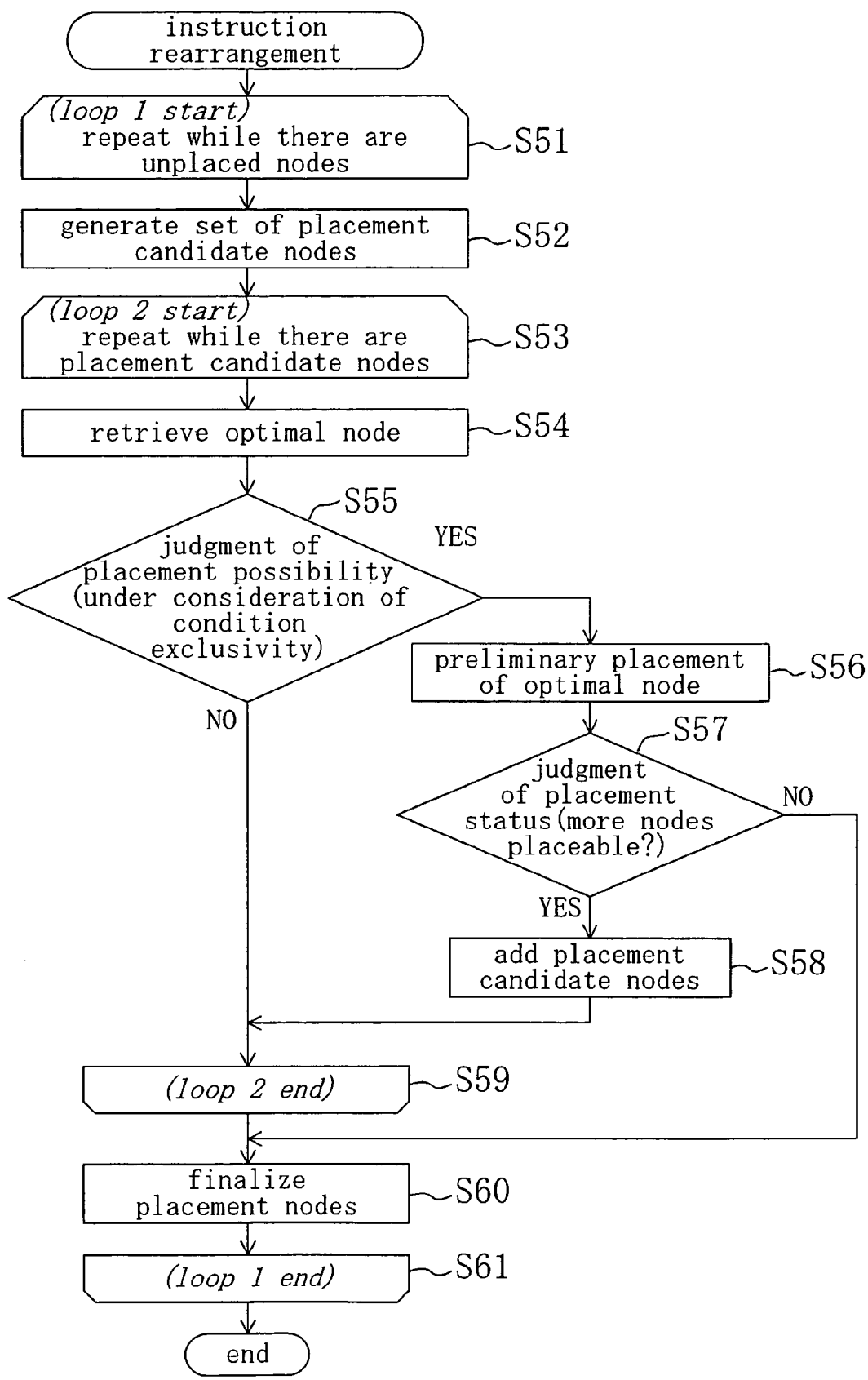
FIG. 18 is a flowchart of the procedure performed by the instruction rearrangement portion in the compiler.

FIG. 18 is a flowchart showing the procedure performed by the instruction rearrangement portion 112. The instruction rearrangement portion 112 repeats the processing (Steps S52 to S60) of the following loop 1 (Steps S51, S61) for all nodes in the dependency graph generated by the dependency analysis portion 111.

First, the instruction rearrangement portion 112 extracts the nodes that can become placement candidates at that time from the dependency graph, and takes them as the set of placement candidate nodes (Step S52). Here, a node that can become a placement candidate is a node for which all predecessors have been placed.

Next, the instruction rearrangement portion 112 repeats the processing (Steps S54 to S58) of the following loop 2 (Steps S53, S59) for all candidate nodes in the set of placement candidate nodes.

First, the node for which a placement at that time is believed to be optimal (referred to simply as "optimal node" in the following) is retrieved from the set of placement candidate nodes (Step S54). A method for determining optimal nodes is explained further below. Subsequently, it is judged whether the optimal node actually can be placed (Step S55), and if it can be placed, then it is preliminarily placed (Step S56). In order to advantageously utilize of the effect of deleting instructions at the decoder stage of the processor explained above, this judgment is made by determining whether the above-described restriction on the computing units, the restriction on the number on the number of execution instructions, and the restriction on the instruction decoder are fulfilled, while considering the exclusivity of the execution conditions of the optimal node and nodes that have already been preliminarily placed. For considering exclusivity, the results of the condition exclusivity analysis portion 110 are utilized. However, for this, it is taken into consideration that in the cycle following an instruction updating the execution condition flags, instructions executed with the corresponding condition are not deleted. That is to say, in that case, the possibility of placement is judged purely with the restrictions on computing units and the number of execution instructions, without considering the exclusivity of execution conditions.

Subsequently, the set of nodes that have been preliminarily placed at that time is determined, and it is judged whether further instructions can be placed or not (Step S57). If it is judged that further placement is not possible, then the loop 2 is terminated and the procedure advances to Step S60.

If it is judged that further placement is possible, then it is judged whether the placement of the optimal node has brought about new nodes that may become placement candidates, and if there are new placement candidates, then they are added to the placement candidate nodes (Step S58). The new placement candidate nodes in Step S58 are nodes that have only the optimal node (which is currently about to be placed) as the predecessor, and that are in a reverse dependency or an output dependency to the optimal node. That is to say, the nodes that can become new placement candidates can be executed in the same cycle as the optimal node, but cannot be executed in a cycle prior to the optimal node.

After the loop 2 has been terminated, the nodes that are included in the set of preliminarily placed nodes are finalized (Step S60). More specifically, the instructions corresponding to the nodes that are included in the set of preliminarily placed nodes are retrieved from the original instructions, and rearranged into a new sequence of instructions to be passed on to the execution boundary addition portion 113. At this stage, some of the placement candidate nodes have been grouped together as instruction groups that can be executed simultaneously, and finalized.

The following is an explanation of a method for determining the optimal node in Step S54. For the optimal node, the instruction with which all instructions to be processed can likely be executed in the shortest time is selected heuristically, by referencing the dependency graph and the preliminary placement region. Here, the instruction is selected for which the total of the execution time of the instructions to the end of the dependency graph at that time is largest. If there are a plurality of instructions fulfilling this condition, then the instruction that comes first in the original instruction order is selected as the optimal node.

Returning to FIG. 12, the execution boundary addition portion 113 sets the parallel execution boundary information E at the end of each instruction group whose placement has been finalized by the instruction rearrangement portion 112 in Step S60.

The object code generating portion 103 converts the assembler code that is output by the instruction scheduling portion 102 into object code 130, and outputs the object code 130 as a file.

Operation of the Compiler

The following is an explanation of the operation of the characteristic structural elements of this complier, using specific instructions as an example.

Figures 19, 20:
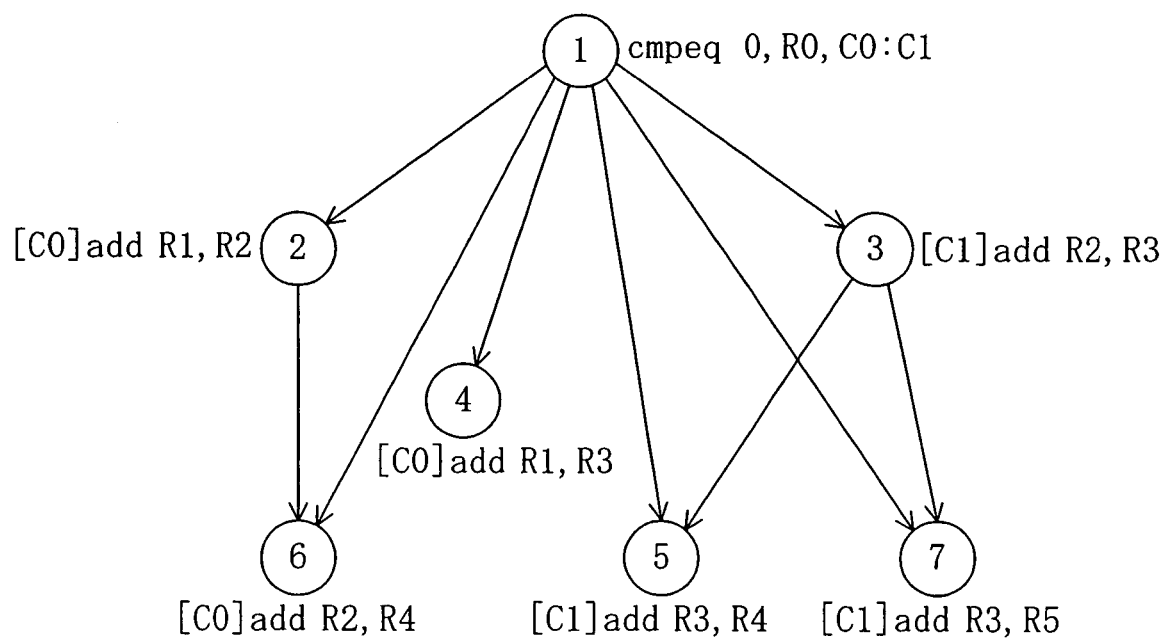
FIG. 19 shows an example of assembler code.
FIG. 20 is a dependency graph corresponding to FIG. 19.

FIG. 19 shows assembler code that has been generated through the assembler code generating portion 101 from source code input into the compiler backend 100. The instruction scheduling portion 102 receives the code in FIG. 19 as input. The meaning of the instructions in FIG. 19 is as follows:

Instruction 1: Compare whether the value stored in register R0 is equal to the constant 0, set the condition flag C0 accordingly to true or false, and set the condition flag C1 to the opposite value.

Instruction 2: If the value of the condition flag C0 is true, add the value stored in register R1 and the value stored in register R2, and store the result in register R2.

Instruction 3: If the value of the condition flag C1 is true, add the value stored in register R2 and the value stored in register R3, and store the result in register R3.

Instruction 4: If the value of the condition flag C0 is true, add the value stored in register R1 and the value stored in register R3, and store the result in register R3.

Instruction 5: If the value of the condition flag C1 is true, add the value stored in register R3 and the value stored in register R4, and store the result in register R4.

Instruction 6: If the value of the condition flag C0 is true, add the value stored in register R2 and the value stored in register R4, and store the result in register R4.

Instruction 7: If the value of the condition flag C1 is true, add the value stored in register R3 and the value stored in register R5, and store the result in register R5.

The following is an explanation of the operation of the instruction scheduling portion 102. First, the condition exclusivity analysis portion 110 and the dependency analysis portion 111 are activated, and a dependency graph is generated. Considering that in the code example in FIG. 19 the condition flags C0 and C1 set in instruction 1 are exclusive from instruction 2 onward, the definition and reference relation of resources is analyzed. FIG. 20 shows the dependency graph that is generated.

Next, the instruction rearrangement portion 112 is activated. Explaining with reference to the flowchart in FIG. 18, in the first cycle, a set of placement candidate nodes is generated (Step S52). In accordance with the dependency graph in FIG. 20, only instruction 1 becomes a placement candidate node at this point. Next, the optimal node is retrieved (Step S54). Here, instruction 1 is selected automatically. Then, in the step judging the possibility of placement (Step S55), placement is judged to be possible. Moreover, in the step judging the placement state (Step S57), it is judged that further placement is possible, but since in the step adding further placement candidate nodes (Step S58) there are no instructions left to be added, the step finalizing the placement nodes (Step S60) finalizes the first cycle such that only instruction 1 is issued.

In the next cycle, instruction 2, instruction 3 and instruction 4 become the placement candidate nodes. Instruction 2 and instruction 3 are selected in that order as optimal nodes and are preliminarily placed. Then, instruction 4 is selected as the optimal node, and the procedure enters the step judging whether placement is possible (Step S55). This judgment is performed under consideration of condition exclusivity, and since in the directly preceding cycle the values of the execution conditions C0 and C1 have been updated, instructions having C0 and C1 as execution conditions are not deleted at the decoding stage in this cycle. Consequently, instruction 2 and instruction 3 which already have been placed preliminarily will not be deleted, so that due to the restriction on the computing units provided in the hardware, simultaneous issue of instruction 4 is impossible, which means that its placement is judged to be impossible. Thus, it is finalized that instruction 2 and instruction 3 are issued in the second cycle.

In the next cycle, instruction 4, instruction 5, instruction 6 and instruction 7 becomes placement candidate nodes. Instruction 4 and instruction 5 are selected in that order as optimal nodes and are preliminarily placed. Then, instruction 6 is selected as the optimal node, and the procedure enters the step judging whether placement is possible (Step S55). This judgment is performed under consideration of condition exclusivity. If the operation of instruction 6 is actually executed, that is, if the execution condition flag C0 of instruction C6 is true, then the condition flag C1 is false, so that the operation of instruction 5, which has C1 as its execution condition, is not executed, and the computing units are not used for it. Consequently, the combination of instruction 4 and instruction 6 fulfills the restriction on the computing units, so that it is judged that placement of instruction 6 is possible. Next, instruction 7 is selected as the optimal node, and as above, if the operation of instruction 7 is executed, then instruction 4 and instruction 6 are deleted, so that the combination of instruction 5 and instruction 7 fulfills the restriction on the computing units, and it is judged that placement of instruction 7 is possible. Thus, the third cycle is finalized such that instruction 4, instruction 5, instruction 6 and instruction 7 are issued. Thus eliminates all unplaced nodes, so that the processing of the instruction rearrangement portion 112 is terminated.

Finally, the execution boundary addition portion 113 is activated, which sets the parallel execution boundary information E in the instructions at the end of instruction groups that have been placed by the instruction rearrangement portion 112. More specifically, the parallel execution boundary information E of instruction 1, instruction 3 and instruction 7 is set to "1," and the parallel execution boundary information E of the remaining instructions is set to "0."

This terminates the processing of the instruction scheduling portion 102. Subsequently, the object code generating portion 103 is activated, and the object code is output.

Figure 21:
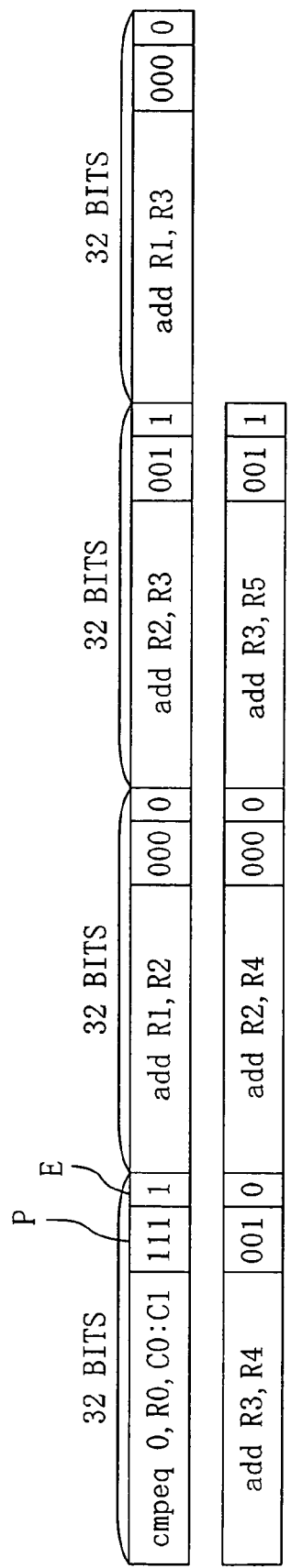
FIG. 21 shows the executable code corresponding to FIG. 19.

FIG. 21 shows the final executable code. The actual executable code is a bit sequence of 128 bit units. The executable code shown in FIG. 21 is executed in three execution groups on a processor having two computing units in accordance with the present invention.

Comparison with Conventional Compiler

Next, the compilation with the compiler of the present invention is compared to the compilation of the assembler code in FIG. 19 with a conventional compiler that does not have the configuration of the compiler of the present invention. The target processor is also a processor provided with two computing units, as in the processor of the present invention.

The compiler of the present invention differs with regard to the instruction rearrangement portion. In the first cycle, only instruction 1 is issued, because of its dependency relations. In the next cycle, instruction 2, instruction 3 and instruction 4 become candidates, but due to the restriction of two computing units per cycle, only instruction 2 and instruction 3 are issued. In the next cycle, instruction 4, instruction 5, instruction 6 and instruction 7 become candidates, but due to the restriction on the computing units, only instruction 4 and instruction 5 are issued. In the next cycle, instruction 6 and instruction 7 become candidates, and since the restriction on the computing units is satisfied, both instructions are issued. Thus, the instruction rearrangement ends. The execution boundary addition portion sets the parallel execution boundary information E of instruction 1, instruction 3, instruction 5 and instruction 7 to "1," and sets the parallel execution boundary information E of the remaining instructions to "0." This ends the instruction scheduling process.

Figure 22:
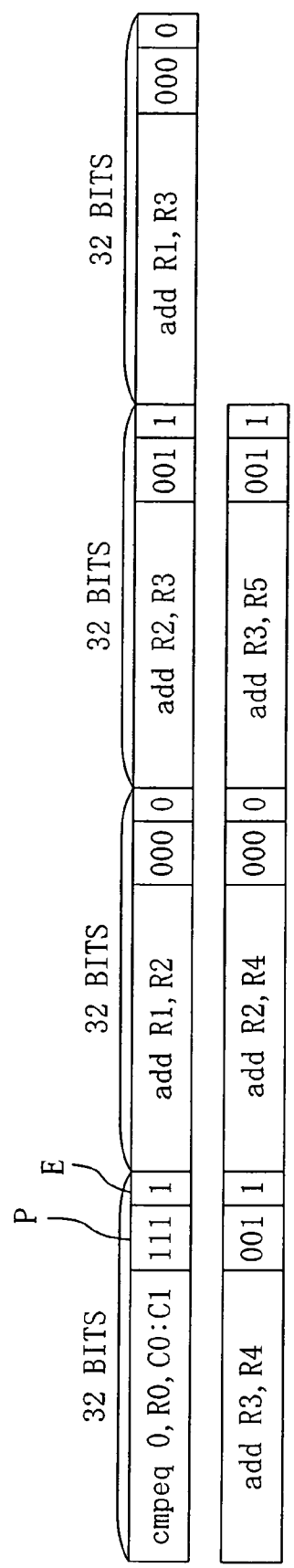
FIG. 22 shows an example of executable code resulting when the code in FIG. 19 is scheduled with a conventional compiler.

FIG. 22 illustrates the executable code generated as a result. The executable code shown in FIG. 22 is executed in four execution groups on a processor having two computing units.

Comparing FIG. 21 and FIG. 22, it can be seen that the code generated by the conventional compiler (FIG. 22) has one execution group more than the code generated by the compiler of the present invention (FIG. 21). That is to say, the number of execution cycles is one cycle greater. The reason why the number of execution groups is greater is because the conventional compiler does not have the instruction scheduling portion 102 of the present invention, so that all instructions are issued to the execution stage, and the arrangement can be performed only with the number of computing units provided in the hardware as the upper limit. On the other hand, in the compiler of the present invention, taking into account the invalidation of instructions, it is possible to arrange more instructions than the number of computing units provided as hardware per cycle, so that the computing units can be utilized efficiently.

It should be noted that the compiler shown in this embodiment can be realized on a computer by storing the procedure of the compiler shown in this embodiment on floppy disk, hard-disk, CD-ROM, MO, DVD or other recording media.

Furthermore, the executable code generated by the compiler of this embodiment can be stored on floppy disk, hard-disk, CD-ROM, MO, DVD, semiconductor memory or other recording media.

Embodiment 3

Processor

The following explains an embodiment of a processor that expands on the processor of Embodiment 1.

The hardware configuration of this processor is for the most part the same as for the above-described processor of Embodiment 1, but a restriction on the placement of execution condition information for instruction groups placed within execution groups is added. More specifically, according to this restriction, within one execution group, instructions having the same execution condition must be placed next to each other. The compiler of Embodiment 4 (described further below) generates code in accordance with to this restriction. Thus, the configuration of the instruction issue control portion of the processor is different.

Configuration and Operation of the Instruction Issue Control Portion

Figure 23:
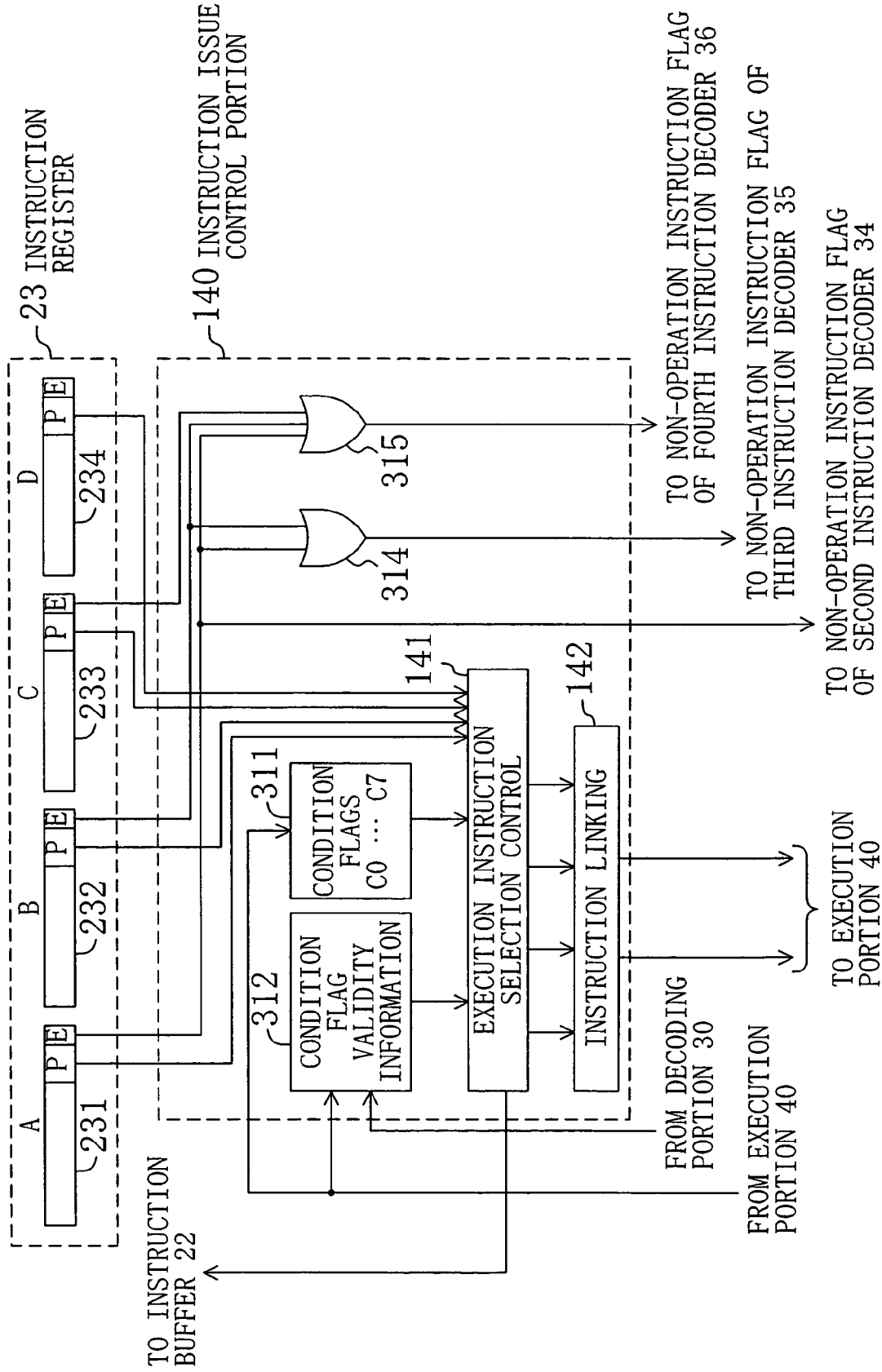
FIG. 23 illustrates the circuit configuration of the instruction issue control portion and environs of a processor according to Embodiment 3 of the present invention.

FIG. 23 shows the configuration of the instruction issue control portion 140 of the processor of this embodiment and its environs. Almost all portions of the instruction issue control portion 140 in FIG. 23 are the same as in the processor of Embodiment 1 shown in FIG. 5. Two aspects are different, namely the control of the execution instruction selection control portion 141 and the fact that an instruction linking portion 142 has been added after the execution instruction selection control portion 141.

First, as in Embodiment 1, the execution instruction selection control portion 141 performs a control that substantially deletes the instructions for which the execution condition is false, but as mentioned above, different from Embodiment 1, there is a restriction on the placement order of instructions, which is rigorously enforced. In particular, there is the restriction on the order of instruction placements that instructions having the same execution condition are placed next to each other, so that instruction groups that have been decoded are classified according to their execution condition. With this restriction on the instruction placement order, this classification can be carried out easily.

Next, it is checked for each of the classified execution conditions whether the value of the execution condition flag has been finalized to "0" or not. Instruction groups having an execution condition whose condition flag has been finalized to "0" are deleted together, and the instruction groups that actually should be sent to the execution portion 40 are determined. Thus, the number of times that the condition flags are checked is minimized, and the deletability of a plurality of instructions can be detected simultaneously, so that the instructions that should be issued to the execution portion 40 can be detected quickly and easily.

Then, after the deletion of instructions with the execution instruction selection control portion 141, the instruction group is entered into the instruction linking portion 142. Here, it is detected whether for instruction groups for which it has been finalized that their operation is actually executed by the execution portion 40, a plurality of instructions can be linked into one compound instruction, and if such linking is possible, the control signal of these instructions is changed to a new compound instruction, the operands are linked, and the instruction on the trailing side are deleted, as with the execution instruction selection control portion 141. Thus, the instruction linking portion 142 outputs operand data and control signals corresponding to two instructions, in accordance with the number of computing units with which the hardware is provided, and transfers the operand data and control signals to the execution portion 40. There is also the possibility that these instructions are compound instructions of a plurality of instructions.

Operation of the Processor

Referring to FIG. 24, the following is an explanation of the specific operation of this processor. FIG. 24 shows an example of a program including conditional execution instructions. This program consists of four instructions, and the notation is the same as in the program of FIG. 9. The mnemonic "lsr" denotes a logical shift to the right of the value stored in the register.

The following is an explanation of the operation of this processor for each execution unit. It is assumed that at the beginning, the value of the condition flag C0 has been finalized to "0" and the value of C1 to "1."

Execution Unit 1

A packet including instruction 1, instruction 2, instruction 3 and instruction 4 is supplied from the external memory, and the instructions are transferred to the instruction register 23. Then, the instruction issue control portion 140 references the parallel execution boundary information E of each instruction. In this case, the parallel execution boundary information E of instruction 1, instruction 2 and instruction 3 is "0," so that the decoding result of the instruction decoder is not invalidated.

Next, the instruction issue control portion 140 references the execution condition information P of each instruction, and the instructions whose operation are executed are selected by the execution instruction selection control portion 141. Instruction 1 is an instruction that is always executed. The execution condition flag of instruction 2 is C0, and the value of C0 has been finalized to "0," so that instruction 2 is effectively deleted and its operation is not executed. The execution condition flag of instruction 3 and instruction 4 which follow is C1, so that the condition flag C1 is referenced only once, and since the value of C1 has been finalized to "1," instruction 3 and instruction 4 are both supposed to be executed. Thus, instruction 1, instruction 3 and instruction 4 are sent to the following instruction linking portion 142.

The instruction linking portion 142 judges for all combinations of the entered instruction group whether a compound instruction can be generated or not. In this case, it is detected that instruction 1 (shift instruction) and instruction 4 (addition instruction) can be linked to generate a shift addition instruction. Then, control signal and operands corresponding to the shift addition are sent as the first instruction, and control signal and operands corresponding to instruction 3 are sent as the second instruction to the execution portion 40. Thus, all instructions that have been supplied are issued.

In the execution portion 40, the value obtained by shifting the value stored in register R3 by the value stored in register R1 to the right and adding the value stored in register R2 is stored in register R2, and the value obtained by adding 1 to the value stored in register R0 is stored in register R0.

Thus, the program shown in FIG. 24 is executed in one execution unit on the processor of this embodiment. With this processor, after deleting instructions due to finalized execution conditions, it is attempted to link instructions into one compound instruction. Thus, it becomes possible to increase the real computation efficiency. Furthermore, using the restriction that instructions having the same execution condition are placed after one another achieves an acceleration of the process of selecting at the decoding stage instructions whose operation is actually executed.

Embodiment 4

Compiler

The following is an explanation of an embodiment relating to a compiler generating code that is executed by the processor of Embodiment 3, as well as a compilation method of the same.

The configuration of this compiler is for the most part the same as for the above-described compiler of Embodiment 2, and aspects that are different are that there is a restriction on the placement for instructions placed within one execution group depending on their execution condition information, and that considerations regarding the linking of instructions at the decoding stage of the processor are added. More specifically, the configuration of the instruction scheduling portion is different.

Instruction Scheduling Portion

Like the instruction scheduling portion 102 of the second embodiment, the instruction scheduling portion of the compiler of this embodiment is configured of a condition exclusivity analysis portion, a dependency analysis portion, an instruction rearrangement portion and an execution boundary addition portion, and differs only in the rearrangement method of the instruction rearrangement portion.

Figure 25:
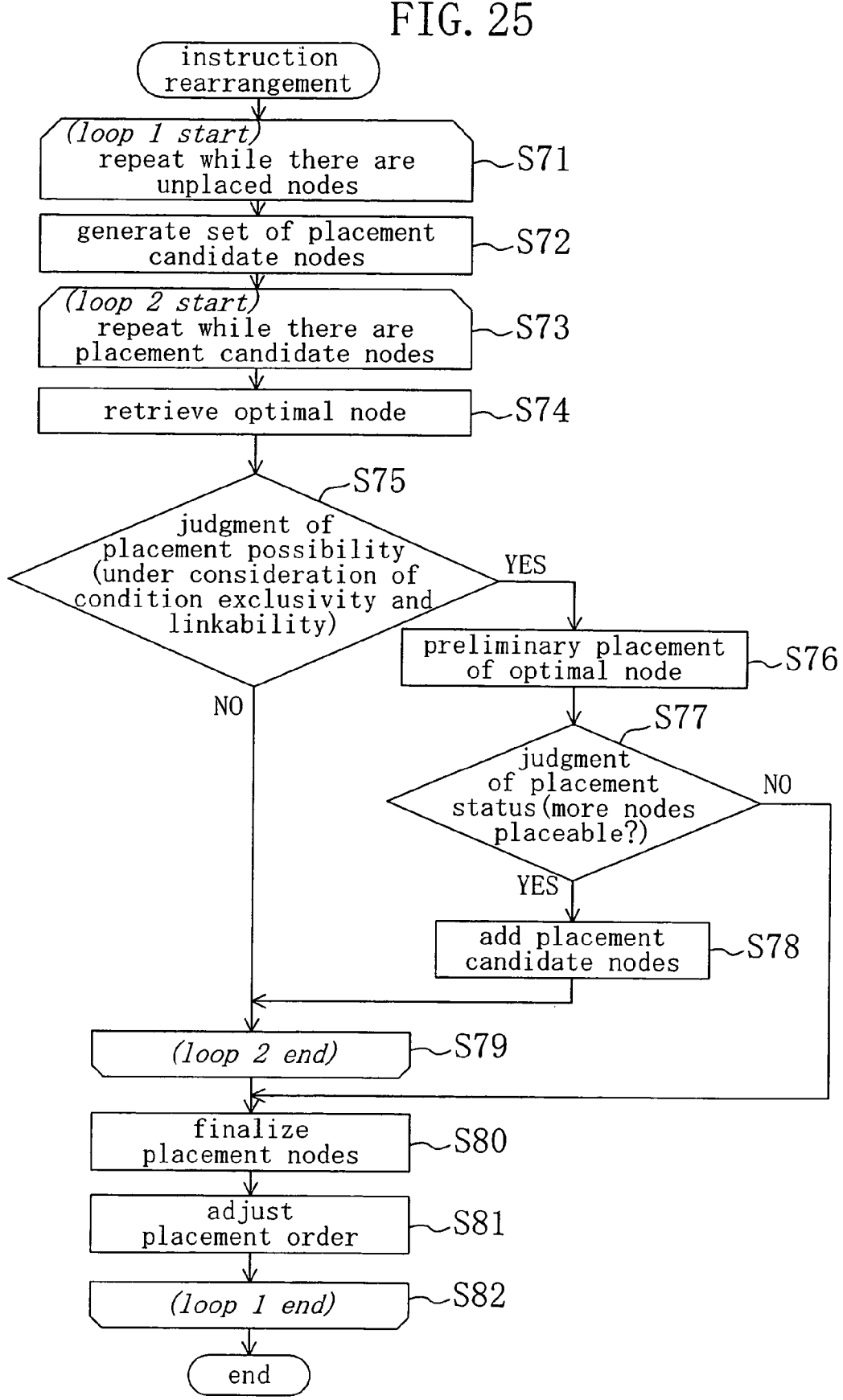
FIG. 25 is a flowchart of the procedure performed by the instruction rearrangement portion in a compiler according to Embodiment 4 of the present invention.

FIG. 25 shows a flowchart of the instruction rearrangement the instruction rearrangement portion of the compiler of this embodiment. The procedure of the instruction rearrangement portion of the compiler of this embodiment is largely the same as that of the instruction rearrangement portion 112 of the compiler in Embodiment 2, but it differs with respect to the portion judging the possibility of placement and in that the arrangement order is adjusted after the finalization of the placement nodes. More specifically, of the Steps S71 to S82 in FIG. 25, the judgment about the possibility of placement (Step S75) and the adjustment of the placement order (Step S81) are different than in the flowchart shown in FIG. 18.

As in the compiler of Embodiment 2, the procedure passes through the condition exclusivity analysis portion and the dependency analysis portion to generate a dependency graph, and then the procedure advances to the instruction rearrangement portion. Then, the rearrangement of instructions is performed based on the dependency graph, which takes condition exclusivity into account, but after the optimal node has been selected in Step S74, the possibility of placement in Step S75 is judged not only in consideration of the exclusivity of the execution conditions for the optimal node and the group of nodes that have already been preliminarily placed, but also in consideration of the possibility of instruction linking for all combinations. That is to say, when two nodes can be linked, then those two nodes are treated as one instruction and placement is judged to be possible.

Moreover, after Step S80 has finalized the nodes for which placement is possible in that cycle, the placement order is adjusted in Step S81. More specifically, the group of nodes for which placement is possible in that cycle is classified by their execution conditions, and the placement order of the nodes is adjusted such that nodes having the same execution condition are placed next to one another. Thus, a simplification of the hardware control is achieved.

Operation of the Compiler

Referring to FIG. 26, the following is an explanation of the operation of the characteristic structural elements of this complier, using specific instructions as an example. FIG. 26 is an example of assembler code generated with the compiler backend portion and the assembler code generating portion. The instruction scheduling portion receives the code of FIG. 26 as input. The meaning of the instructions in FIG. 26 is as follows. It should be noted that the condition flags C0 and C1 have been set to an exclusive relation by an instruction prior to instruction 1.

Instruction 1: Shift the value stored in register R3 for the value stored in register R1 to the right.

Instruction 2: If the value of the condition flag C1 is true, add 1 to the value stored in register R0 and store the result in register R0.

Instruction 3: If the value of the condition flag C0 is true, subtract 1 from the value stored in register R0 and store the result in register R0.

Instruction 4: If the value of the condition flag C1 is true, add the value stored in register R1 and the value stored in register R2, and store the result in register R2.

The following is an explanation of the operation of the instruction scheduling portion. First, the condition exclusivity analysis portion and the dependency analysis portion are activated, and a dependency graph is generated. The resource definition and reference relations are analyzed under the consideration that in this example the condition flags C0 and C1 are mutually exclusive.

Next, the instruction rearrangement portion is activated. Explaining with reference to the flowchart in FIG. 25, first a set of placement candidate nodes is generated (Step S72). Here, only instruction 1 becomes a placement candidate node. Next, the optimal node is retrieved (Step S74). Here, instruction 1 is selected automatically. Then, in the placement possibility judgment (Step S75), placement is judged to be possible. Moreover, in the placement state judgment (Step S77), it is judged that further placement is possible. Then in the placement candidate node addition (Step S78), instruction 2, instruction 3 and instruction 4 are added to the placement candidate nodes as instructions to be added.

Then, the procedure returns and the next optimal node is retrieved (Step S74). At this point, instruction 2 is selected first, and it is judged that placement is possible (Step S75).

After that, the procedure returns and the next optimal node is retrieved (Step S74). At this point, instruction 3 is selected. Since the execution conditions of instruction 2 and instruction 3 are mutually exclusive, the restriction due to the two computing units is fulfilled, and it is judged that placement is possible (Step S75).

Then, the procedure returns and the next optimal node is retrieved (Step S74). At this point, the remaining instruction 4 is automatically selected. Then, placement possibility is judged (Step S75), and if it is assumed that the execution C0 is true, only instruction 1 and instruction 3 become valid, so that the restriction on the computing units is fulfilled. On the other hand, if it is assumed that the execution C0 is true, then three instructions, namely instruction 1, instruction 2 and instruction 4 become valid. At this point, the possibility of linking instructions is examined for all combinations of these. In this case, it is judged that it is possible to link instruction 1 and instruction 4 to a shift addition instruction that is provided by the hardware, and as a result only two instructions are valid, so that it is judged that placement is possible.

As described above, all instructions are placed in the first cycle, and the placement nodes are finalized (Step S80). Next, the nodes are classified by execution condition, and the placement order is adjusted (Step S81). More specifically, the execution condition is C1 for both instruction 2 and instruction 4, and the placement order is rearranged to instruction 1>instruction 2>instruction 4>instruction 3, so that instruction 2 and instruction 4 are placed next to one another. Thus, the processing of the instruction rearrangement portion ends.

Finally, the execution boundary addition portion is activated, which sets the parallel execution boundary information in the instruction at the end of the instruction group that has been placed by the instruction rearrangement portion. More specifically, the parallel execution boundary information of instruction 3 is set to "1," and the parallel execution boundary information of the other instructions is set to "0." Thus, the processing of the instruction scheduling portion ends.

As described above, with the compiler of this embodiment, the sequence of instructions shown in FIG. 26 is compiled so as to be executed in one execution group. Here, the effect is attained by the fact that the linking of instructions in the decoding stage of the processor is considered in the placement possibility judgment (Step S75). Furthermore, adjusting the order of instructions such that instructions having the same execution condition are placed next to one another simplifies the control for selecting the valid instructions in the decoder stage of the processor.

It should be noted that the compiler explained in this embodiment can be realized on a computer by storing the procedure of the compiler shown in this embodiment on floppy disk, hard-disk, CD-ROM, MO, DVD or other recording media.

Furthermore, the executable code generated by the compiler of this embodiment can be stored on floppy disk, hard-disk, CD-ROM, MO, DVD, semiconductor memory or other recording media.

The foregoing is an explanation embodiments of processors and compilers in accordance with the present invention, but needless to say, the present invention is not limited to these embodiments. The following lists several modified examples:

(1) In the processors and compilers of the above-described embodiments, it was assumed that instructions of a fixed length are executed, but the present invention is not limited to such an instruction format, and the present invention is equally significant when applied to instruction formats of variable length.

(2) It was assumed that the processors and the compilers of the above-described embodiments have two computing units, but there is no limitation regarding the number of computing units in the present invention, and the present invention is equally significant for processors having one or three or more computing units.

(3) In the processors and compilers of the above-described embodiments, it was assumed that the compiler extracts the instruction parallelism statically, but there is no limitation to the parallel processing of instructions in the present invention. For example, the present invention is equally significant when adopting the super-scalar approach in which the instruction parallelism is extracted dynamically on the hardware level. In this case, the parallel execution boundary information E is eliminated from the instruction format of the present invention, and it should be performed while dynamically detecting with the instruction issue control portion all processing that depends on this information.

(4) With the instruction rearrangement portion of the compilers of the above-described embodiments, the sum of the execution time to the end of the dependency graph was used for the method for determining optimal nodes in Step S54 of FIG. 18, but the present invention is not limited to this selection criterion. For example, it is also possible to preferentially select certain paths from a plurality of execution flows. In that case, the priority of an instruction having a certain execution condition is increased when retrieving the optimal node (Step S54). Thus, it is possible to perform scheduling that is specialized in certain execution paths, such as paths with high execution frequency.

(5) In the instruction issue control portion of the processors of the above-described embodiments, the decoding result of all instructions after the first instruction whose parallel execution boundary information E is "1" is invalidated, but this is not absolutely necessary. If, up to the first instruction whose parallel execution boundary information E is "1," there is not a single instructions that is judged to be transferred to the execution portion by the execution instruction selection control portion in the instruction issue control portion, then that entire cycle may be eliminated, and the instruction group until the next instruction whose parallel execution boundary information E is "1" may be taken as the instructions to be issued in that cycle. That is to say, only if, up to the instruction whose parallel execution boundary information E is "1," there is at least one instruction for which it is judged that its valid operation should be executed, then this instruction is regarded as the boundary of parallel execution, and the decoding result of the following instructions is invalidated. If not, then the parallel execution boundary information E of that instruction may ignored, and the next boundary for parallel execution may be detected by referencing the parallel execution boundary E of subsequent instructions. Thus, the number of execution cycles can be further reduced.

The invention may be embodied in other forms without departing from the spirit or essential characteristics thereof. The embodiments disclosed in this application are to be considered in all respects as illustrative and not limiting. The scope of the invention is indicated by the appended claims rather than by the foregoing description, and all changes which come within the meaning and range of equivalency of the claims are intended to be embraced therein.

What is claimed is:

1. A compiling apparatus for converting a source code of a program notated in a high-level language into an object code, said compiling apparatus comprising:

a storage device;

an assembler code generating portion for generating, from the source code, an assembler code sequence including a plurality of assembler codes, each of the plurality of assembler codes having an execution condition field designating a register to be accessed and a parallel execution boundary field designating an assembler code group including at least one assembler code of the plurality of assembler codes to be executed in parallel;

an instruction scheduling portion for modifying the assembler code sequence to include a first assembler code group including at least two assembler codes to be executed in parallel to set a value on a parallel execution boundary field of an assembler code included in the first assembler code group therein, the first assembler code group including a first assembler code and a second assembler code such that a value determined in response to a flag stored in a register designated by an execution condition field of the first assembler code designates one of true or false and a value determined in response to a flag stored in a register designated by an execution condition field of the second assembler code designates the other one of true or false, where the number of assembler codes included in the first assembler code group is greater than the number of at least one executing unit included in a target processor; and an object code generating portion for converting the modified assembler code sequence modified by the instruction scheduling portion to the object code and for outputting the object code as a file to the storage device, wherein the first assembler code and the second assembler code are assigned to a same execution unit in the target processor.

2. The compiling apparatus according to claim 1, wherein each of at least one value determined in response to at least one flag stored in at least one register designated by at least two execution condition fields of the at least two assembler codes included in the first assembler code group simultaneously designates either true or false, and the at least two assembler codes included in the first assembler code group can be replaced to a compound assembler code.

3. The compiling apparatus according to claim 1, wherein each execution condition field of each of a plurality of assembler codes included in the first assembler code group designates the same register, where the plurality of assembler codes are arranged next to each other in the first assembler code group.

4. A compiling apparatus for converting source code of a program notated in a high-level language into an object code said compiling apparatus comprising:

a storage device;

an assembler code generating portion for generating, from the source code, an assembler code sequence including a plurality of assembler codes, each of the plurality of assembler codes having an execution condition field designating a register to be accessed and a parallel execution boundary field designating an assembler code group including at least one assembler code of the plurality of assembler codes to be executed in parallel;

an instruction scheduling portion for modifying the assembler code sequence to include a first assembler code group including at least two assembler codes to be executed in parallel to set a value on a parallel execution boundary field of an assembler code included in the first assembler code group therein, the first assembler code group including a first assembler code and a second assembler code such that a value determined in response to a flag stored in a register designated by an execution condition field of the first assembler code designates one of true or false and a value determined in response to a flag stored in a register designated by execution condition field of the second assembler code designates the other one of true or false, where the number of assembler codes included in the first assembler code group is greater than the number of at least one executing unit included in a target processor; and an object code generating portion for converting the modified assembler code sequence modified by the instruction scheduling portion to the object code and for outputting the object code as a file to the storage device, wherein the first assembler code group including a third assembler code, and the instruction scheduling portion assigns the third assembler code to a different executing unit from an executing unit of the at least one executing unit in the target processor to which either the first assembler code or the second assembler code is assigned when a value determined in response to a flag stored in a register designated by an execution condition field of the third assembler code has not been fixed.

5. The compiling apparatus according to claim 4, wherein the instruction scheduling portion further modifies the assembler code sequence to include a second assembler code group including at least one instruction to be executed in parallel before the first assembler code group to set a value on a parallel execution boundary field of an instruction included in the second assembler code group therein, and the instruction scheduling portion judges assigning the third instruction to the different executing unit of the at least one executing unit in the target processor whether the second assembler code group includes an instruction updating the flag in the register designated by the execution condition field of the third assembler code or not.

6. The compiling apparatus according to claim 4, wherein each of at least one value determined in response to at least one flag stored in at least one register designated by at least two execution condition fields of the at least two assembler codes included in the first assembler code group simultaneously designates either true or false, and the at least two assembler codes included in the first assembler code group can be replaced to a compound assembler code.

7. The compiling apparatus according to claim 6, wherein the instruction scheduling portion farther modifies the assembler code sequence to include a second assembler code group including at least one instruction to be executed in parallel before the first assembler code group to set a value on a parallel execution boundary field of an instruction included in the second assembler code group therein, and the instruction scheduling portion judges assigning the third instruction to the different executing unit of the at least one executing unit in the target processor whether the second assembler code group includes an instruction updating the flag in the register designated by the execution condition field of the third assembler code or not.

8. A compiling apparatus for converting a source code of a program notated in a high-level language into an object code, said compiling apparatus comprising:
  a storage device;
  an assembler code generating portion for generating, from the source code, an assembler code sequence including a plurality of assembler codes, each of the plurality of assembler codes having an execution condition field designating a register to be accessed and a parallel execution boundary field designating an assembler code group including at least one assembler code of the plurality of assembler codes to be executed in parallel;
  an instruction scheduling portion for modifying the assembler code sequence to include a first assembler code group including at least two assembler codes to be executed in parallel to set a value on a parallel execution boundary field of an instruction included in the first assembler code group, each of at least one value determined in response to at least one flag stored in at least one register designated by at least two execution condition fields of the at least two assembler codes simultaneously designating either true or false, and the at least two assembler codes can be replaced to a compound assembler code, where the number of assembler codes included in the first assembler code group is greater than the number of at least one executing unit included in a target processor; and
  an object code generating portion for converting the modified assembler code sequence modified by the instruction scheduling portion to the object code and for outputting the object code as a file to the storage device,
  wherein the compound assembler code is assigned to one of the at least one executing unit.

9. A compilation method for converting a source code of a program notated in a high-level language into an object code, comprising the steps of:
  an assembler code generating step for generating, by using a program processing device, from the source code, an assembler code sequence including a plurality of assembler codes, each of the plurality of assembler codes having an execution condition field designating a register to be accessed and a parallel execution boundary field designating an assembler code group including at least one assembler code of the plurality of assembler codes to be executed in parallel;
  an instruction scheduling step for modifying the assembler code sequence to include a first assembler code group including at least two assembler codes to be executed in parallel to set a value on a parallel execution boundary field of an assembler code included in the first assembler code group, the first assembler code group including a first assembler code and a second assembler code such that a value determined in response to a flag stored in a register designated by an execution condition field of the first assembler code designates one of true or false and a value determined in response to a flag stored in a register designated by an execution condition field of the second assembler code designate the other one of true or false, where the number of assembler codes included in the first assembler code group is greater than the number of at least one executing unit included in a target processor; and
  an object code generating step for converting the modified assembler code sequence modified by the instruction scheduling step to the object code,
  wherein the first assembler code and the second assembler code are assigned to a same execution unit in the target processor.

10. A compilation method for converting a source code of a program notated in a high-level language into an object code, comprising the steps of:
  an assembler code generating step for generating, by using a program processing device, from the source code, an assembler code sequence including a plurality of assembler codes, each of the plurality of assembler codes having an execution condition field designating a register to be accessed and a parallel execution boundary field designating an assembler code group including at least one assembler code of the plurality of assembler codes to be executed in parallel;
  an instruction scheduling step for modifying the assembler code sequence to include a first assembler code group including at least two assembler codes to be executed in parallel to set a value on a parallel execution boundary field of an instruction included in the first assembler code group, each of at least one value determined in response to at least one flag stored in at least one register designated by at least two execution condition fields of the at least two assembler codes simultaneously designating either true or false, and the at least two assembler codes can be replaced to a compound assembler code, where the number of assembler codes included in the first assembler code group is greater than the number of at least one executing unit included in a target processor; and
  an object code generating step for converting the modified assembler code sequence modified by the instruction scheduling step to the object code,
  wherein the compound assembler code is assigned to one of the at least on executing unit.

11. A compilation method for converting source code of a program notated in a high-level language into an object code, the method comprising:
  an assembler code generating step for generating, by using a program processing device, from the source code, an assembler code sequence including a plurality of assembler codes, each of the plurality of assembler codes having an execution condition field designating a register to be accessed and a parallel execution boundary field designating an assembler code group including at least one assembler code of the plurality of assembler codes to be executed in parallel;
  an instruction scheduling step for modifying the assembler code sequence to include a first assembler code group including at least two assembler codes to be executed in parallel to set a value on a parallel execution boundary field of an assembler code included in the first assembler code group therein, the first assembler code group including a first assembler code and a second assembler code such that a value determined in response to a flag stored in a register designated by an execution condition field of the first assembler code designates one of true or false and a value determined in response to a flag stored in a register designated by execution condition field of the second assembler code designates the other one of true or false, where the number of assembler codes included in the first assembler code group is greater than the number of at least one executing unit included in a target processor; and an object code generating step for converting the modified assembler code sequence modified in the instruction scheduling step to the object code and for outputting the object code as a file to a storage device, wherein the first assembler code group including a third assembler code, and in the instruction scheduling step, the third assembler code is assigned to a different executing unit from an executing unit of the at least one executing unit in the target processor to which either the first assembler code or the second assembler code is assigned when a value determined in response to a flag stored in a register designated by an execution condition field of the third assembler code has not been fixed.

* * * * *